United States Patent
Anasiewicz

(10) Patent No.: US 8,596,389 B2
(45) Date of Patent: Dec. 3, 2013

(54) MOTORIZED BEACH CART

(76) Inventor: Stephen A. Anasiewicz, Hopewell, NJ (US)

(*) Notice: Subject to any disclaimer, the term of this patent is extended or adjusted under 35 U.S.C. 154(b) by 243 days.

(21) Appl. No.: 13/067,327

(22) Filed: May 25, 2011

(65) Prior Publication Data
US 2012/0160577 A1  Jun. 28, 2012

Related U.S. Application Data

(63) Continuation-in-part of application No. 12/929,015, filed on Dec. 22, 2010, now Pat. No. 8,511,406.

(51) Int. Cl.
B62D 51/04 (2006.01)

(52) U.S. Cl.
CPC ..................... B62D 51/04 (2013.01)
USPC .......... 180/19.1; 180/65.6; 180/208

(58) Field of Classification Search
USPC .......... 180/19.1, 19.2, 65.1, 65.6, 208
See application file for complete search history.

(56) References Cited

U.S. PATENT DOCUMENTS

| 2,740,484 | A |   | 8/1950  | Montana |            |
|-----------|---|---|---------|---------|------------|
| 2,879,858 | A |   | 3/1959  | Thomas  |            |
| 3,146,824 | A | * | 9/1964  | Veilleux | 160/23.1  |
| 3,266,813 | A | * | 8/1966  | Bosko et al. | 280/8 |
| 3,370,664 | A |   | 2/1968  | Caplan  |            |
| 3,388,761 | A | * | 6/1968  | Arpin   | 180/208   |
| 3,896,893 | A |   | 7/1975  | Willis et al. |      |
| 3,948,332 | A |   | 4/1976  | Tyner   |            |
| 4,106,583 | A |   | 8/1978  | Nemeth  |            |
| 4,289,212 | A |   | 9/1981  | Immel   |            |
| 4,538,695 | A |   | 9/1985  | Bradt   |            |
| 4,570,732 | A | * | 2/1986  | Craven  | 180/19.3  |
| 4,807,716 | A |   | 2/1989  | Hawkins |            |
| 5,180,023 | A | * | 1/1993  | Reimers | 180/19.1  |
| 5,232,065 | A | * | 8/1993  | Cotton  | 180/11    |
| 5,370,572 | A | * | 12/1994 | Lee     | 446/462   |
| 5,915,722 | A | * | 6/1999  | Thrasher et al. | 280/649 |
| 5,988,671 | A |   | 11/1999 | Abelbeck et al. |    |
| 6,276,471 | B1 |  | 8/2001  | Kratzenberg et al. |  |
| 6,331,013 | B2 | * | 12/2001 | Choi et al. | 280/647 |
| 6,378,883 | B1 | * | 4/2002  | Epstein | 280/250.1 |
| 6,386,557 | B1 | * | 5/2002  | Weldon  | 280/30    |
| 6,390,216 | B1 | * | 5/2002  | Sueshige et al. | 180/65.51 |
| 7,017,691 | B2 |  | 3/2006  | Lu      |            |
| 7,021,408 | B2 | * | 4/2006  | Fricker | 180/19.1  |

(Continued)

Primary Examiner — Anne Marie Boehler
Assistant Examiner — Maurice Williams
(74) Attorney, Agent, or Firm — Roylance, Abrams, Berdo & Goodman, L.L.P.

(57) ABSTRACT

A motorized cart, including: a collapsible frame with a collapsible storage compartment, a front wheel, and two rear wheels rotating about a single axis. The frame has a folding support platform including hingedly connected first and second portions. The first portion rotatably connects at a front of the frame, and the second portion rotatably connects to a rear of the frame. A drive compartment houses a battery, a drive controller, and a motor for driving a rear wheel, and is positioned on the frame to position the battery, the drive controller, and the motor below and forward of the axis in an expanded, upright mode, thereby positioning a cart center of gravity forward of the axis. The drive compartment is shaped and positioned on the frame to: permit the collapsing of the storage compartment and the frame to a collapsed mode; provide clearance for the front wheel during transition between the collapsed mode and the expanded, upright mode; and substantially vertically align the cart center of gravity with the axis in a tilted mode, operating only on the two rear wheels.

19 Claims, 25 Drawing Sheets

(56) References Cited

U.S. PATENT DOCUMENTS

| | | | |
|---|---|---|---|
| 7,055,847 B2 * | 6/2006 | Miller et al. ............ 280/638 |
| 7,210,545 B1 | 5/2007 | Wald |
| 7,293,619 B2 | 11/2007 | Mitchell, Jr. |
| 7,490,684 B2 * | 2/2009 | Seymour et al. ......... 180/65.1 |
| 7,635,037 B2 | 12/2009 | Treadwell et al. |
| 7,735,587 B1 | 6/2010 | Stahlnecker |
| 7,762,363 B1 | 7/2010 | Hirschfeld |
| 7,967,174 B2 * | 6/2011 | Lauber .................... 224/407 |
| 7,984,916 B2 | 7/2011 | Schwager |
| 8,118,120 B2 | 2/2012 | Flowers et al. |
| 8,286,739 B2 * | 10/2012 | Oliphant ................ 180/65.1 |
| 2003/0141121 A1 * | 7/2003 | Flowers et al. ........ 180/65.1 |
| 2004/0216933 A1 | 11/2004 | Coale |
| 2005/0252700 A1 | 11/2005 | Kitauchi et al. |
| 2006/0087097 A1 * | 4/2006 | Kramer et al. ......... 280/304.1 |
| 2007/0080002 A1 * | 4/2007 | Liao ....................... 180/65.1 |
| 2008/0041644 A1 * | 2/2008 | Tudek et al. ............ 180/65.1 |
| 2008/0196951 A1 * | 8/2008 | Gal et al. ............... 180/65.1 |
| 2012/0118657 A1 | 5/2012 | Liao |

* cited by examiner

MOTORIZED BEACH CART

CROSS-REFERENCE TO RELATED APPLICATION

This application is a continuation-in-part of U.S. application Ser. No. 12/929,015, filed Dec. 22, 2010, now U.S. Pat. No. 8,511,406 the disclosure of which is incorporated herein by reference in its entirety.

BACKGROUND OF THE INVENTION

1. Field of the Invention

The present invention relates generally to beach carts, and more particularly, to a motorized beach cart.

2. Description of the Related Art

Many beach-goers drive to parking lots relatively near the beach, and from there make many trips to ferry all the desired equipment, such as chairs, umbrellas, and coolers to the beach. Thus, a beach cart for carrying such items is desirable to reduce the number of trips. Such a cart, however, is typically transported in or on the car to and from the parking lot. Pushing and/or pulling such a cart, particularly if heavily laden, can be inconvenient. To ease the physical burden on the beachgoer, a motorized cart is desirable. Many examples of motorized carts are known, particularly with respect to motorized golf carts for carrying golf bags and clubs. But these carts lack features that are focused on the needs of beach cart users.

For example, U.S. Pat. No. 7,017,691 to Lu discloses a foldable motorized cart with a battery and a motor disposed directly on a base without being compartmentalized. In a beach environment, such exposed equipment would degrade quickly and could easily become clogged with sand. Additionally, although the cart is disclosed as having an attachable basket, in such a configuration the cart cannot be collapsed for storage.

U.S. Pat. No. 4,106,583 to Nemeth discloses a self-powered folding golf cart that has a battery housing that is disposed fairly high on the device and may pose stability issues. Additionally, although the front wheel and the rear legs are collapsible, the device lacks a collapsible storage compartment.

U.S. Patent Publication No. 2005/0252700 to Kitauchi et al. discloses a vehicle designed for carrying golf clubs in which wheels are used as fulcrums to tilt the vehicle for moving. But this device also lacks a collapsible storage compartment.

Motorized beach carts are also known, but lack features desired by beach-goers. U.S. Pat. No. 7,210,545 to Wald discloses a three-wheeled motorized cart with a propulsion assembly disposed beneath and supporting a front end of a cart platform that supports a tubular cargo frame assembly. The device lacks the ability to store compactly.

U.S. Pat. No. 7,762,363 to Hirschfeld discloses a motorized beach wagon that is convertible to a table. While convenient in these two configurations, this device is also not easily storable in a compact manner.

Further, to protect natural dunes and/or for erosion control, many beaches have raised boardwalks or sections thereof that require traversal of stairs to get to the beach. None of the above-noted carts are disclosed as capable of climbing stairs. Examples of known motorized stair climbing carts include U.S. Pat. No. 3,370,664 and U.S. Pat. No. 2,740,484. U.S. Pat. No. 3,370,664 to Caplan discloses a motorized stair-climbing cart with treads having recesses on the inside thereof that engage motor driven sprocket teeth. The treads also have outwardly extending lugs that engage the edges of stairs to climb the stairs. U.S. Pat. No. 2,740,484 to Montana discloses a motor driven stair climbing hand truck in which a climbing unit is selectively deployed from the chassis and power is disconnected from the driven traction elements, such as the wheels. The climbing unit includes climbing rollers that engage the stairs to lift the hand truck up the stairs. Both of these devices, however, require complex and/or expensive specialized equipment to provide the stair-climbing ability. Such equipment may not fare well in the salt and sand of the beach.

In addition, it may be desirable for the beach cart to have a horizontal surface to set a radio or drinks on, and/or to keep items accessible, but out of the sand.

What is needed is a motorized beach cart that has a collapsible storage container and a collapsible frame for easy storage and transportation of the cart. Additionally, the cart should be stable, ruggedized, and adaptable to multiple transportation situations, including traversing sand and stairs. Further, the cart should have a horizontal storage surface.

SUMMARY OF EMBODIMENTS OF THE INVENTION

Accordingly, it is an aspect of the present invention to provide a motorized cart that is collapsible for easy storage and is stable in multiple configurations for differing transportation situations.

The foregoing and/or other aspects of the present invention are achieved by providing a motorized cart, including: a collapsible frame having a handle and a collapsible storage compartment connected to the frame; and at least three wheels, including a front wheel and two rear wheels disposed at a rear of the frame for rotating about a single axis. The cart also includes means for connecting the rear wheels at a rear of the frame for rotating about a single axis, and a folding support platform including first and second portions hingedly connected to each other. The first portion rotatably connects at a front of the frame, and the second portion rotatably connects at the rear of the frame. The cart additionally includes a drive compartment housing a battery, a drive controller, and at least one motor electrically connected to the battery and the drive controller for driving at least one of the rear wheels. The drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability. The drive compartment is shaped and positioned on the frame to permit the collapsing of the storage compartment and the frame to a collapsed mode for compact storage of the cart, and to provide clearance for the at least one front wheel during transition between the collapsed mode and the expanded, upright mode. The drive compartment is positioned on the frame to substantially vertically align the center of gravity of the cart with the rear wheel rotation axis in a tilted mode, in which the cart operates on the two rear wheels.

The foregoing and/or other aspects of the present invention are also achieved by providing a method of manufacturing a motorized cart, including providing a collapsible frame and a collapsible storage compartment thereon, the frame and storage compartment being movable between a collapsed, storage mode and an expanded, upright mode. The frame has front legs, rear legs rotatably connected to the front legs, and a folding support platform comprising first and second portions hingedly connected to each other, the first portion being rotatably connected at a front of the frame, and the second portion being rotatably connected to a rear of the frame. The method also includes providing a pair of rear wheels on the frame, the cart being rotatable about an axis of rotation of the rear wheels; and providing at least one front wheel on the frame. The method also includes providing a drive compartment housing a battery, a drive controller, and at least one motor electrically connected to the battery and the drive controller for driving at least one of the rear wheels. The drive compartment having a pair of driving compartment supports for supporting an axle connecting the rear wheels in front of the rear legs. The drive compartment is positioned on the frame and shaped to: substantially vertically align a center of gravity of the cart with the rear wheel rotation axis when the cart is in a tilted mode; position the center of gravity of the cart forward of the rear wheel rotation axis in the expanded, upright mode; and provide for clearance of the at least one front wheel during transition between the collapsed, storage mode and the expanded, upright mode. The method additionally includes providing controls on the frame for controlling speed and direction of travel.

The foregoing and/or other aspects of the present invention are also achieved by providing a kit for motorizing a cart having a handle, a collapsible frame and a collapsible storage compartment, and at least one front wheel. The kit includes a folding support platform including first and second portions hingedly connected to each other, the first portion being rotatably connected at a front of the frame, and the second portion being rotatably connected at a rear of the frame. The kit additionally includes a battery, a drive controller, at least one motor, at least one gear housing corresponding to the at least one motor, user controls, a pair of rear wheels connectable to the frame, and an axle that serves as the axis of rotation of the rear wheels. The kit also includes a drive compartment for housing the battery, drive controller, and the at least one motor. The drive compartment is shaped to provide clearance for the front wheel during transition between a collapsed cart mode and an expanded, upright cart mode. The drive compartment is connectable to the frame so that a center of gravity of the cart is positioned forward of the rear wheel rotation axis when the cart is in the expanded, upright mode, the drive compartment does not impede collapsing of the storage compartment and the frame, and, the center of gravity of the cart is substantially vertically aligned with the rear wheel rotation axis in a tilted mode, in which the cart operates on the two rear wheels. The kit additionally includes a pair of driving compartment supports disposed in the driving compartment for supporting the axle connecting the rear wheels in front of the rear legs. The kit further includes cabling for electrically connecting the battery, the drive controller, the at least one motor, and the user controls, and attaching means for attaching the cabling to the frame. The rear wheels are connectable to the frame so that at least one of the pair of wheels is connectable with the at least one motor using the at least one gear housing.

Additional and/or other aspects and advantages of the present invention will be set forth in part in the description that follows and, in part, will be apparent from the description, or may be learned by practice of the invention.

BRIEF DESCRIPTION OF THE DRAWINGS

The above and/or other aspects and advantages of embodiments of the invention will become apparent and more readily appreciated from the following detailed description, taken in conjunction with the accompanying drawings, of which.

DETAILED DESCRIPTION

Figure 2:
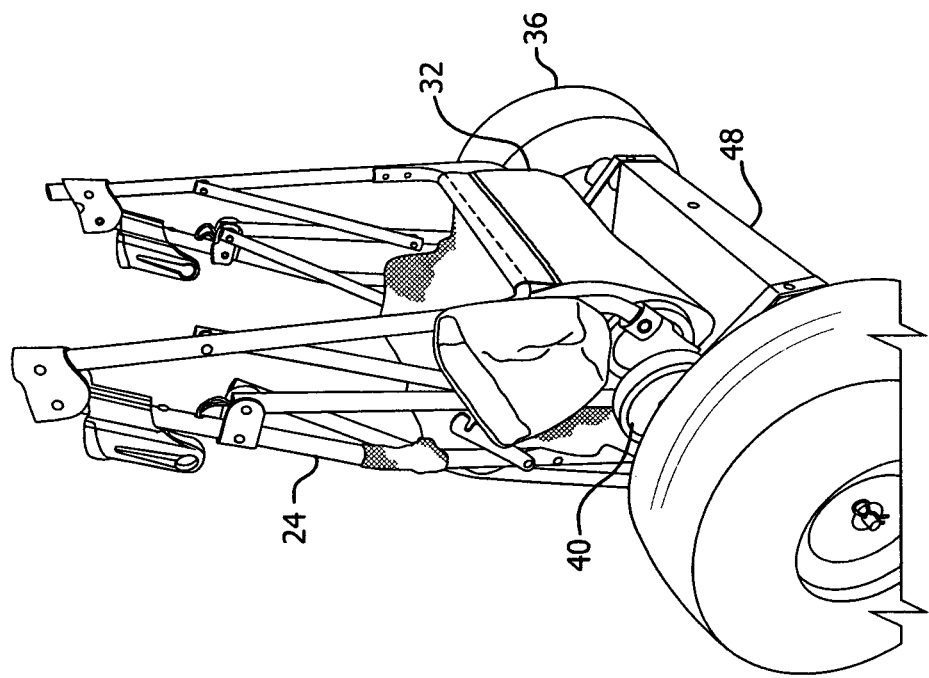
FIG. 2 is a perspective view of the cart of FIG. 1 in a collapsed mode.

Reference will now be made in detail to embodiments of the present invention, examples of which are illustrated in the accompanying drawings, wherein like reference numerals refer to the like elements throughout. The embodiments described herein exemplify, but do not limit, the present invention by referring to the drawings. As will be understood by one skilled in the art, terms such as up, down, bottom, and top are relative, and are employed to aid illustration, but are not limiting.

Figure 1:
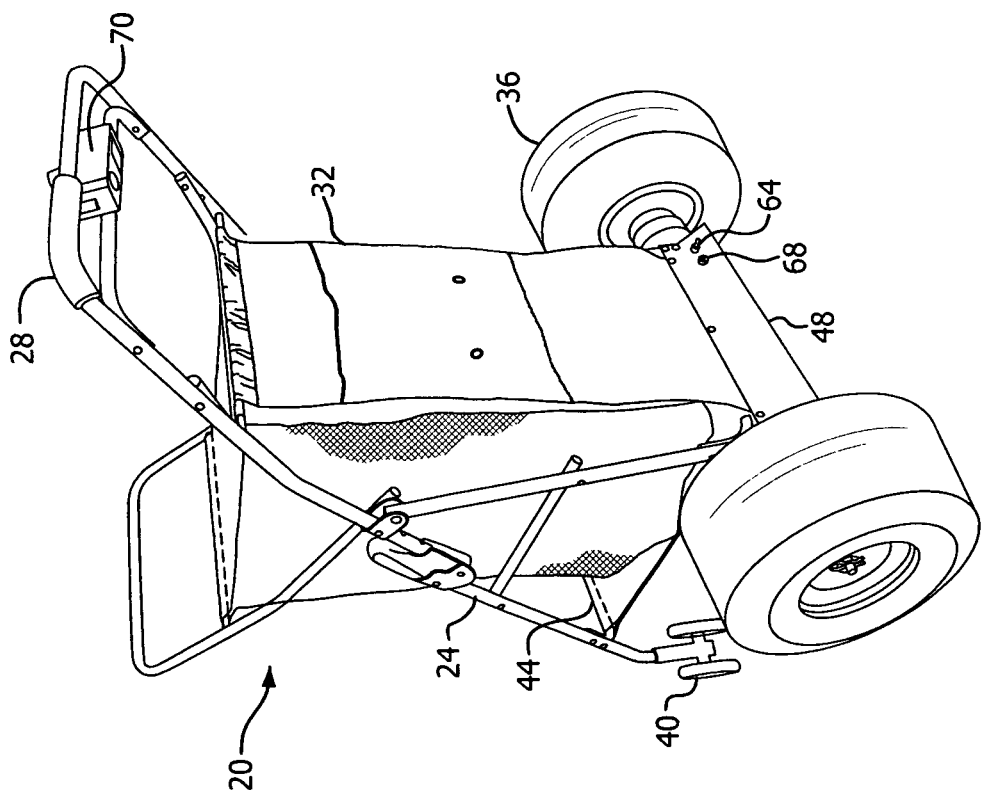
FIG. 1 is a perspective view of a motorized cart in an expanded, upright mode in accordance with an embodiment of the present invention.

FIG. 1 is a rear, left perspective view of a motorized cart 20 in an expanded, upright mode in accordance with an embodiment of the present invention. The cart 20 includes a frame 24, a handle 28 connected to the frame 24, and a storage compartment 32 connected to the frame 24. The cart 20 also preferably includes a pair of rear wheels 36 and two pairs of front wheels 40, all of which are connected to the frame 24. Each of the pairs of front wheels 40 includes a pair of wheels connected by an axle and forms a caster that is connected to the frame 24 and rotates about a substantially vertical axis when the cart 20 is in an expanded, upright mode. In addition, the cart 20 includes a collapsible shelf 44 at a lower portion thereof for holding larger items, for example, a cooler.

Further, the cart 20 includes a drive compartment 48 disposed on the frame 24 between the two rear wheels 36. The drive compartment 48 houses a battery 52, a drive controller 56, and a pair of motors 60 that are electrically connected to the battery 52 and the drive controller 56 (see FIG. 9). A main power switch 64 and a charging port 68 are preferably disposed on a rear of the drive compartment 48, as shown in FIG. 1. As discussed in greater detail below, the drive controller 56 is electrically connected to user controls 70 disposed on the handle 28

Figure 3:
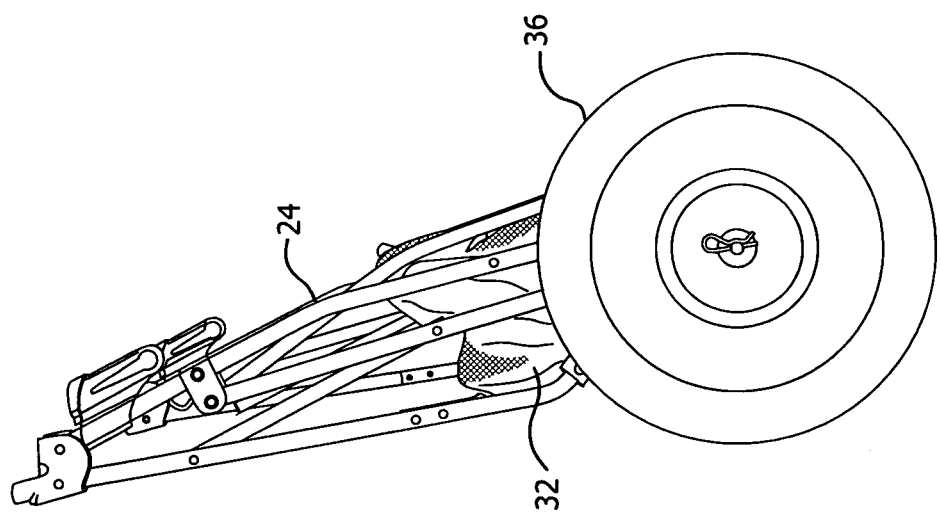
FIG. 3 is a left side view of the cart of FIG. 1 in the collapsed mode.

FIG. 2 is a front, right perspective view of the cart 20 and FIG. 3 is a left side view of the cart 20. In FIGS. 2 and 3, the cart 20 is in a collapsed mode. As shown in FIGS. 2 and 3, both the frame 24 and the storage compartment 32 are foldable, or collapsible to make the cart 20 smaller. In other words, in the collapsed mode, the size and/or the volume occupied by the cart is significantly reduced, thereby facilitating efficient storage and ease of transport. As will be described in greater detail below, as shown in FIG. 2, in the collapsed mode, the front wheels 40 are positioned adjacent to the drive compartment 48.

Figure 4:
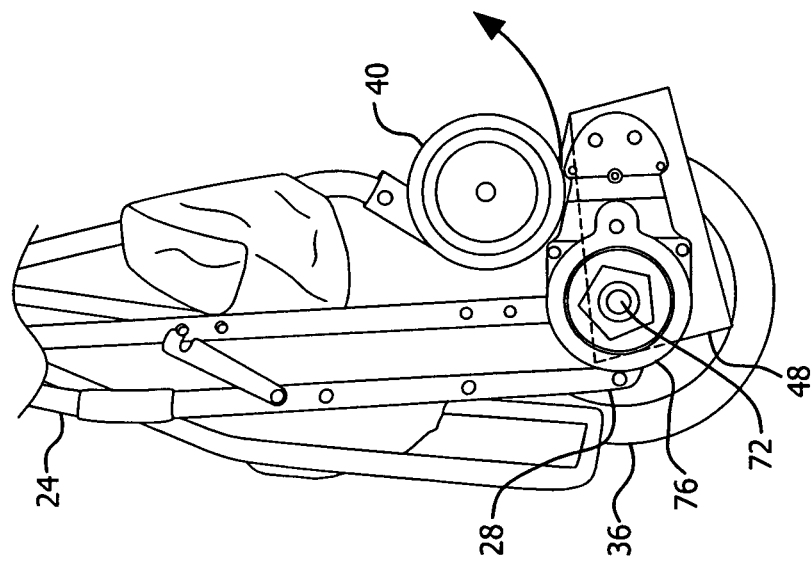
FIG. 4 is a partial right side view of the cart of FIG. 1.
Figure 5:
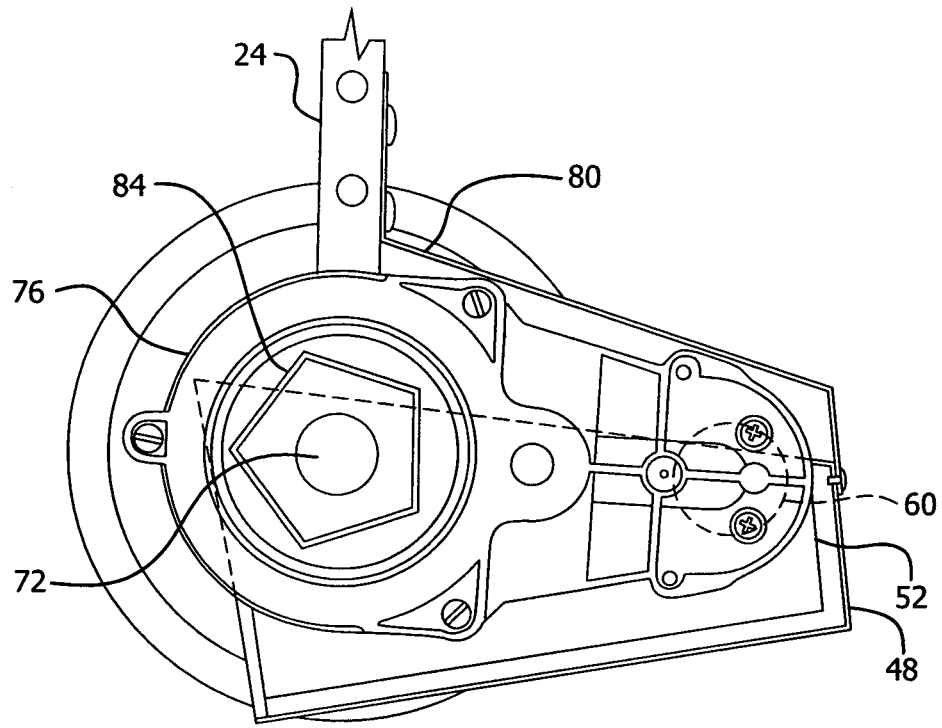
FIG. 5 is a partial perspective view of a right side of the cart of FIG. 1 illustrating a drive compartment.

The right rear wheel 36 is removed in FIG. 4 for clarity. As shown, in the collapsed mode, the front wheels 40 are positioned above and closely adjacent to the drive compartment 48, the outline of which is shown in a combination of solid and broken lines. Similarly, FIG. 5 illustrates an enlarged view of the drive compartment 48 with the outline shown in the combination of solid and broken lines. As shown in FIG. 4, when the front wheel 40 moves in or out of the collapsed mode (in other words, transitions between the collapsed mode to the expanded, upright mode) the shape and positioning of the drive compartment 48 provides clearance for the path of the front wheel 40.

Figure 6:
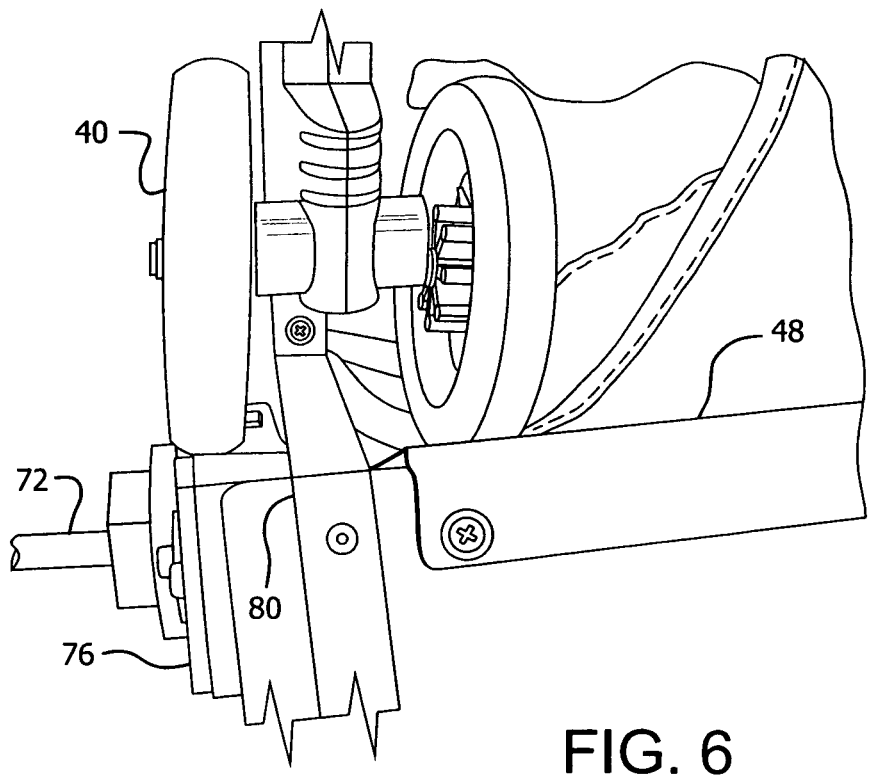
FIG. 6 is a partial perspective view of the cart of FIG. 1 in the collapsed mode illustrating a front wheel and the drive compartment.

In addition, as shown in FIGS. 4 and 5 and discussed in greater detail below, the cart 20 also includes an axle 72 connecting the rear wheels 36. The radial center of the axle 72 is the axis of rotation for the rear wheels 36. The axle 72 passes through a hole 74 (see FIG. 7) in a gear housing 76 that connects the motor 60 with the rear wheel 36. Further, as shown in FIG. 4, and more clearly in FIGS. 5 and 6, the drive compartment 48 preferably includes a strap 80 for connecting the drive compartment 48 to the frame 24. According to one embodiment, the strap 80 includes a pair of straps 80 disposed at lateral ends of the drive compartment 48. As shown in FIG. 6, when the cart 20 is in the collapsed mode, each pair of front wheels 40 straddles one of the straps 80. In other words, each of the pairs of front wheels 40 preferably has one wheel disposed on each lateral side of one of the straps 80. This configuration helps provide stable support of the drive compartment 48 with respect to the frame 24 and also provides for a compact posture of the cart 20 in the collapsed mode.

Figure 7:
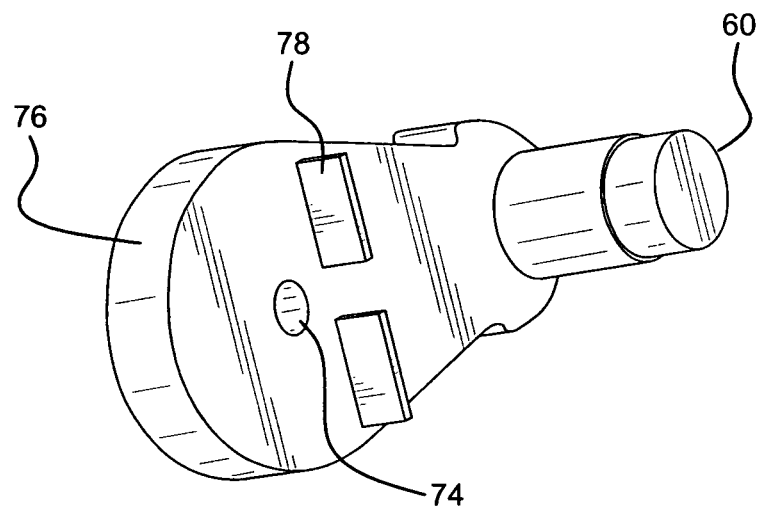
FIG. 7 is a perspective view of a motor and a gear housing of the cart of FIG. 1.

According to one embodiment, as shown in FIG. 7, the motor 60 is connected directly to the gear housing 76. Inside the gear housing 76, a series of gears intermesh between the motor 60 and a driving gear that is concentrically disposed with the hole 74 through which the axle 72 passes. The driving gear has a driving protrusion 84 (see FIG. 5) disposed thereon for driving the rear wheel 36. The driving protrusion 84 is best shown in FIG. 5, and is illustrated as being pentagonal. One skilled in the art will appreciate that other shapes may be used without departing from the scope of the invention. Examples of other shapes include triangles, squares, hexagons, radial spokes, etc. According to one embodiment, each of the rear wheels 36 is driven by a motor 60 connected with a gear housing 76. The gear housings 76 are disposed at lateral ends of the drive compartment 48. According to one embodiment, the gear housings 76 are only partially disposed within the drive compartment 48. Additionally, as discussed in greater detail below, according to one embodiment, the gear housing 76 includes a pair of engaging protrusions 78.

Figure 8:
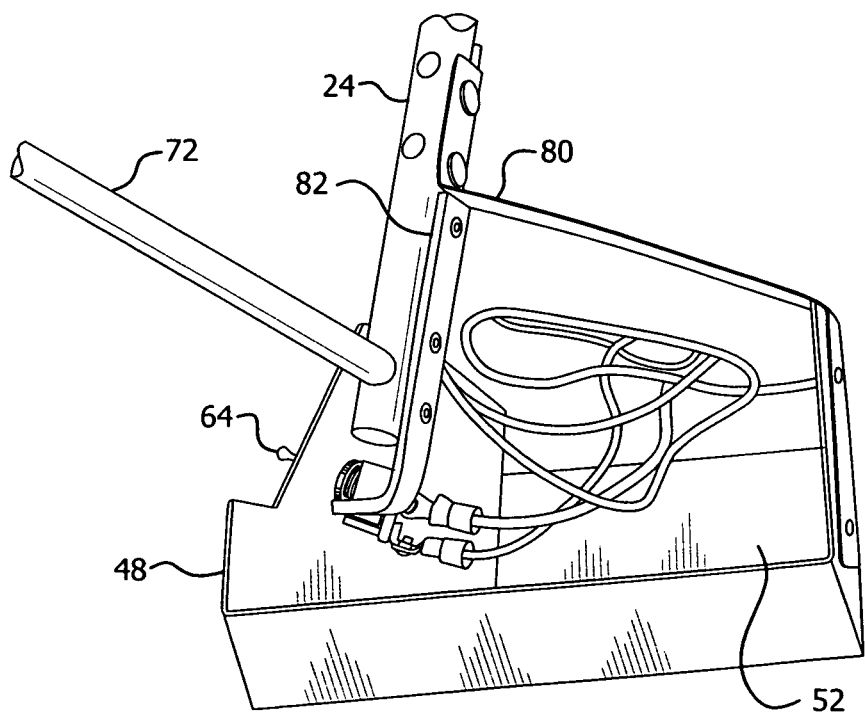
FIG. 8 is a partial perspective side view of the cart of FIG. 1 illustrating an interior of the drive compartment.

FIG. 8 is a partial perspective side view of the cart 20 illustrating an interior of the drive compartment 48. In FIG. 8, the rear wheel 36 and a top cover of the drive compartment 48 are removed for clarity. As shown, the cart 20 includes a gear housing bracket 82 disposed on the frame 24. According to on embodiment, the gear housing 76 is mounted so that the engaging protrusions 78 engage the gear housing bracket 82 to prevent the gear housing 76 from rotating with respect to the axle 72 and the frame 24.

Figure 9:
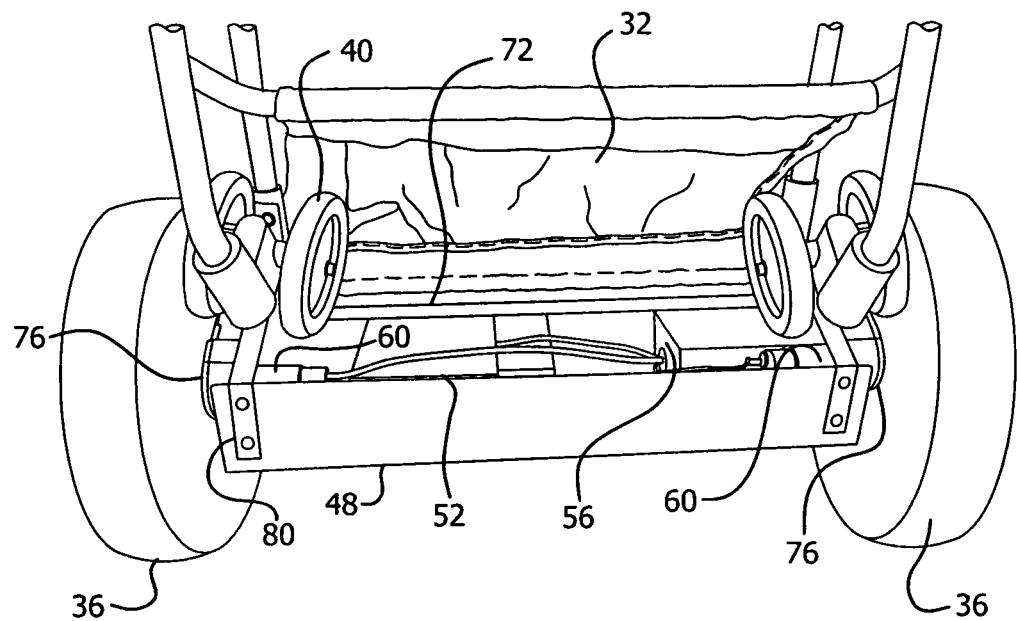
FIG. 9 is another partial perspective front view of the cart of FIG. 1 illustrating the interior of the drive compartment.

FIG. 9 is a partial perspective front view illustrating the interior of the drive compartment 48. In FIG. 9, the top cover of the drive compartment 48 is removed for clarity. As shown, the motors 60, the battery 52, and the drive controller 56 are disposed within the drive compartment 48. The motors 60 are electrically connected to the battery 52 and the drive controller 56. Although the cart 20 is illustrated in the collapsed mode in FIG. 9, the drive compartment 48 is positioned on the frame 24 so that in the expanded, upright mode (shown, for example, in FIG. 11), the battery 52, the drive controller 56, and the motors 60 are positioned below and forward of the axle 72. Such positioning of the drive compartment 48 helps to provide a low center of gravity for the cart, and thereby aids stability. According to one embodiment, the axle 72 passes through an upper portion of the drive compartment 48.

Figure 10:
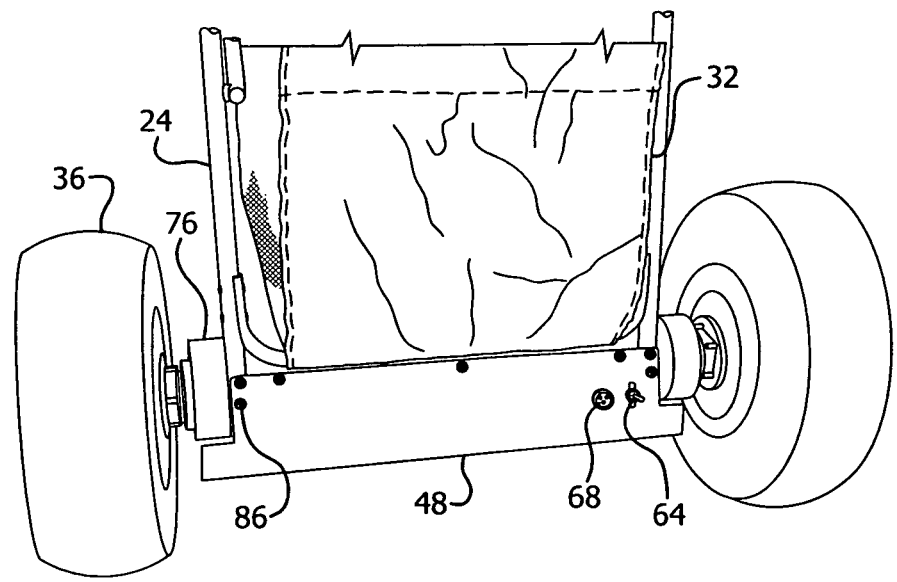
FIG. 10 is a partial perspective view illustrating a rear of the drive compartment of the cart of FIG. 1.

FIG. 10 illustrates a rear of the drive compartment 48. In addition to the above-mentioned straps 80, according to one embodiment, a rear portion of the drive compartment 48 is connected to the frame 24 by fasteners 86, such as screws. As shown, the main power switch 64 and the charging port 68 are easily accessible on the rear of the drive compartment 48. Such positioning of the main power switch 64, for example, allows a user to turn the cart 20 on and off with a foot, so that the user does not have to bend down. Moreover, as shown in FIG. 10, in addition to providing clearance for the path of the front wheel 40 during transition between the collapsed mode and the expanded, upright mode, the shape and positioning of the drive compartment 48 also provides significant ground clearance to accommodate traversing rough terrain and/or soft sand.

Figure 12:
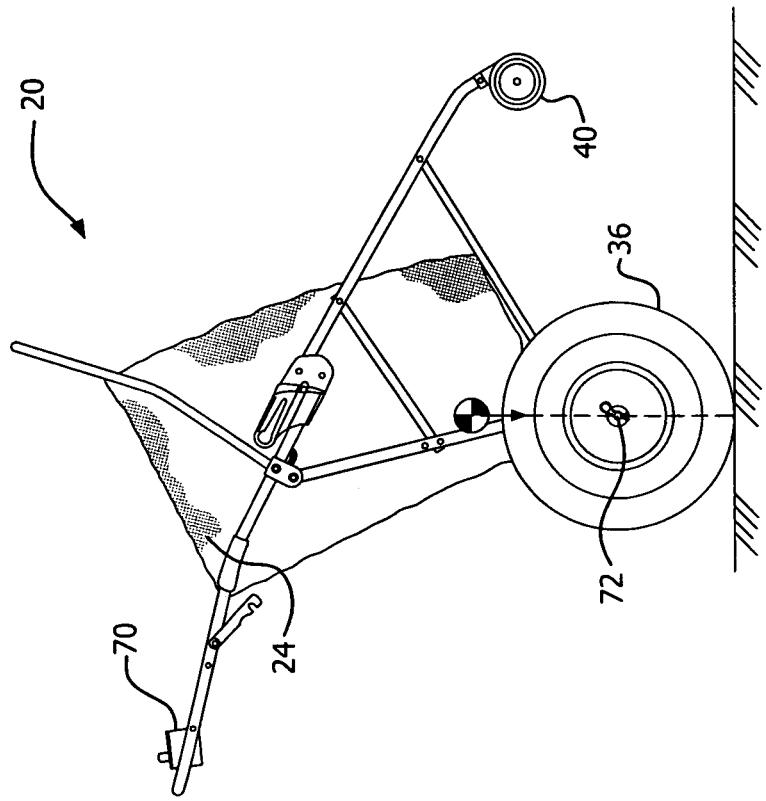
FIG. 12 is a right side view of the cart of FIG. 1 in a tilted mode.
Figure 11:
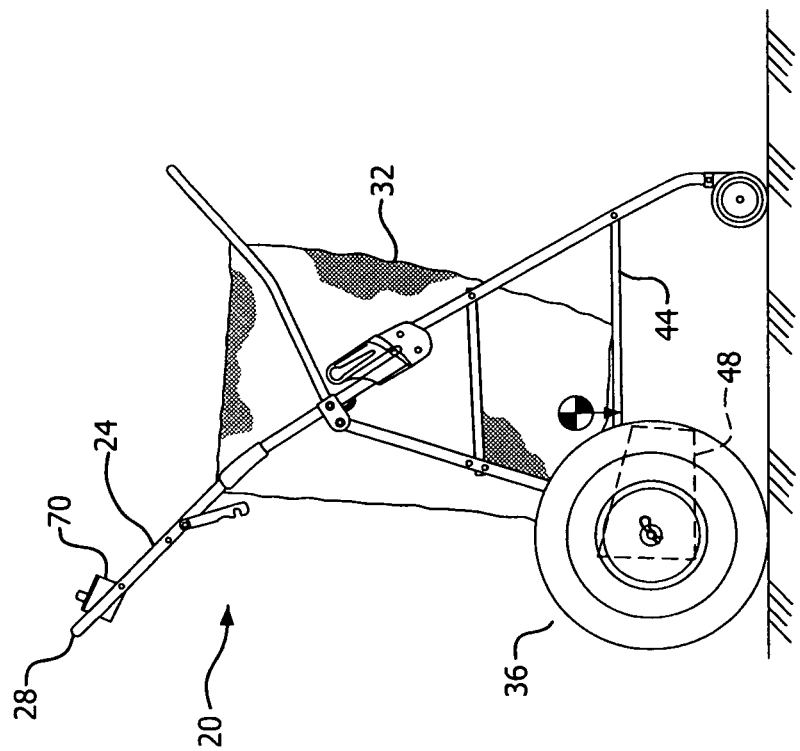
FIG. 11 is a right side view of the cart of FIG. 1 in the expanded, upright mode.

FIG. 11 illustrates the right side of the cart 20 in the expanded, upright mode, and FIG. 12 illustrates the right side of the cart 20 in a tilted mode. At least in part due to the positioning of the drive compartment and in the components housed therein, as shown in FIG. 11, in the expanded, upright mode, the center of gravity of the cart 20 is positioned forward of the rear wheel rotation axis. This configuration enhances the stability of the cart 20 in the expanded, upright mode. With all the wheels 36, 40 on the ground, the user can operate or drive the cart 20 in the expanded, upright mode. Preferably, however, the user drives the cart 20 in the tilted mode, as shown in FIG. 12. To transition from the expanded, upright mode to the tilted mode, with the axle 72 acting as a fulcrum, the user rotates the cart 20 about the axle 72 to lift the front wheels 40 off the ground and substantially vertically align the center of gravity of the cart 20 with the axle 72. According to one embodiment, at least in part due to the positioning of the drive compartment 48, the cart 20 can easily balance in the tilted mode without support from the user.

Figure 13:
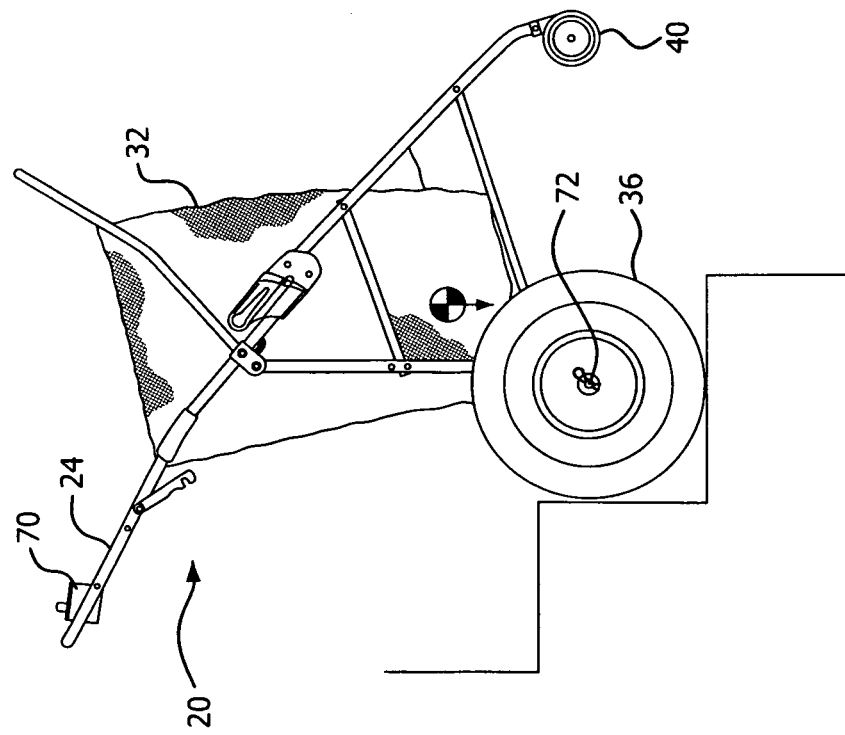
FIG. 13 is a right side view of the cart of FIG. 1 in a stair-climbing mode.

FIG. 13 illustrates the right side of the cart 20 in a two-wheeled stair climbing mode. The rear wheels 36 are sized, and the output of the motors 60 is designed so that the cart 20 can climb stairs under power. According to one embodiment, each of the motors has an output of about 12 volts and 170 Watts. In addition, according to one embodiment, the gearing ratio for the gear housing 76 from the rear wheel to the motor is about 123:1. The rise of standard stairs is usually around 6-9 inches and the tread of standard stairs is usually around 10 or 11 inches. According to one embodiment, the rear wheels 36 are about 14 inches in diameter and about 7 inches in width. In addition, as shown in FIG. 13, the drive compartment 48 is disposed on the frame 24 so that the center of gravity of the cart 20 is positioned slightly forward of the axle 72 in the stair climbing mode. This configuration requires the user to maintain contact and control of the cart 20 in the stair climbing mode. According to another embodiment, the rear wheels 36 are made of rubber and are about 5 inches in width and 13 inches in diameter.

Figure 14:
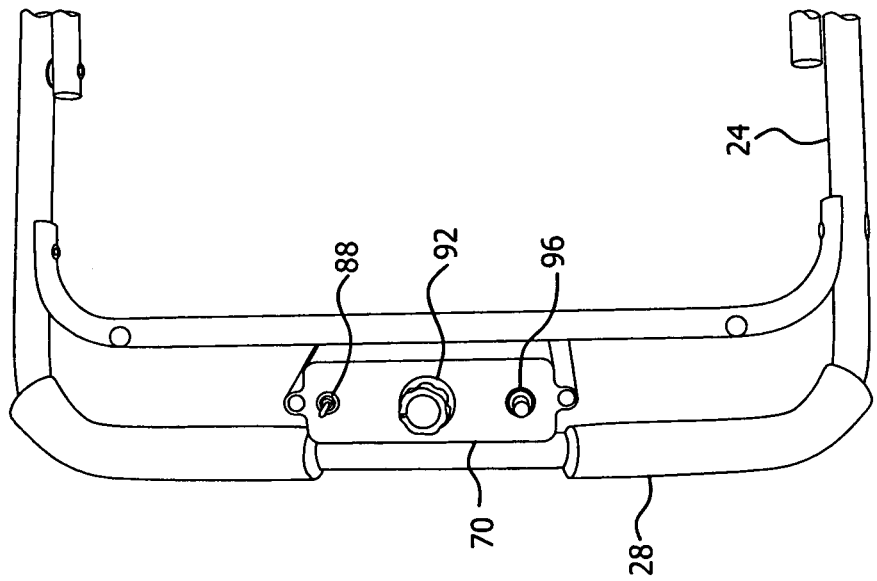
FIG. 14 is a perspective view of user controls of the cart of FIG. 1.

FIG. 14 is a perspective view of the user controls 70 of the cart 20. As noted above, the drive controller 56 is electrically connected to the user controls 70. According to one embodiment, wires connecting the drive controller 56 and the user controls 70 are disposed within the frame 24. As shown in FIG. 14, user controls 70 include a forward/reverse switch 88 and a speed controller 92. To use the forward/reverse switch 88, the user selects a desired direction of travel, either forward or reverse and sets the switch 88 to the desired direction. According to one embodiment, the speed controller 92 includes a rheostat 92. The user varies the setting of the rheostat 92 to change the output of the motors 60, and thus the speed of the cart 20. According to one embodiment, the user controls 70 also include an operate/brake controller 96. Additionally, according to one embodiment, the operate/brake controller 96 includes a single-pole push button 96. In operation, the user presses the single-pole push button 96 to drive the motors 60, and thus the cart 20. When the user releases the single-pole push button 96, the motors 60 cease driving the rear wheels 36. This configuration prevents the cart from running away from the user. Thus, in effect, the single-pole push button 96 operates as a dead man brake.

Figure 15:
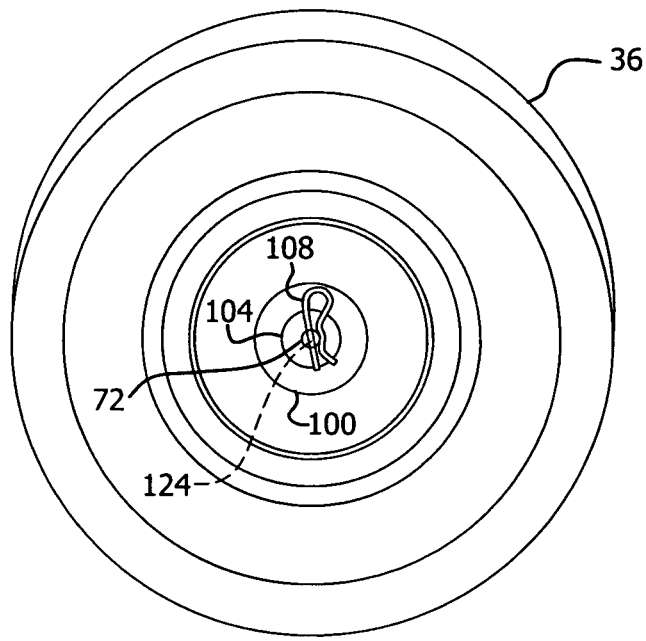
FIG. 15 is a perspective view of an outside of a quick-connect/disconnect feature of a wheel of the cart of FIG. 1.
Figure 16:
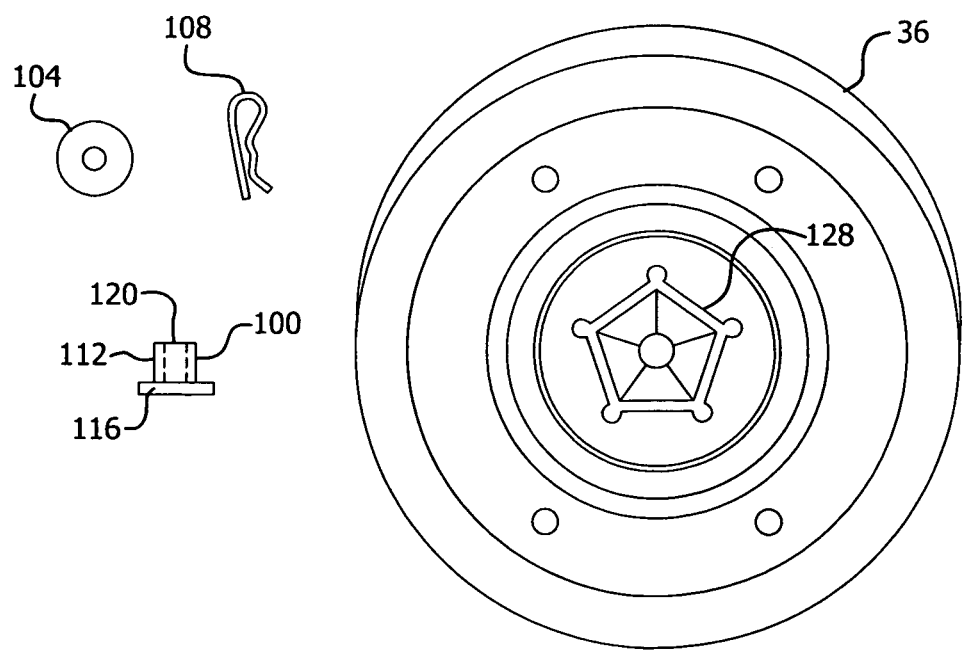
FIG. 16 is a perspective view of an inside of the quick-connect/disconnect feature of the wheel of the cart of FIG. 1.

FIGS. 15 and 16 respectively illustrate the outside and inside of one of the rear wheels 36. In one embodiment, the rear wheels 36 are made of a durable plastic. According to another embodiment, the rear wheels 36 are made of an elastomeric material, such as rubber. Further, according to one embodiment, each of the rear wheels 36 has a quick-connect/disconnect fitting for attaching the rear wheels 36 to the frame 24, and for detaching the rear wheels 36 from the frame to minimize a storage and/or transportation volume of the cart 20. According to one embodiment, the click-connect/disconnect fitting includes a hub 100, a washer 104, and a Cotter pin 108. The hub 100 includes a reduced diameter portion 112 and a flange portion 116 connected to the reduced diameter portion 112. The hub 100 also has a hole 120 disposed axially therethrough to accommodate the axle 72. As shown in FIG. 15, the axle 72 includes a Cotter pin hole 124 disposed radially therethrough to accommodate the Cotter pin 108.

Referring to the aforementioned driving protrusion 84 (shown, for example, in FIG. 5), according to one embodiment, as shown in FIG. 16, the quick-connect/disconnect fitting also includes a corresponding drive recess 128 centrally disposed on an inside of each of the rear wheels 36. As illustrated, the corresponding drive recess 128 is pentagonal to correspond with the driving protrusion 84. Like the driving protrusion 84, however, other shapes may be employed.

To assemble the rear wheels 36 to the frame 24, the user places one of the rear wheels 36 onto the axle 72, inserting the axle 72 through a central axial bore of the rear wheel 36, and connecting the corresponding drive recess 128 to the drive protrusion 84. although the drive protrusion 84 is illustrated as being disposed on the gear housing 76 and the corresponding drive recess 128 is illustrated as being disposed on the rear wheel 36, one skilled in the art will appreciate that the corresponding drive recess 128 may be disposed on the gear housing 76 and the drive protrusion 84 may be disposed on the rear wheel 36 without departing from the scope of the invention. According to one embodiment, the axle 72 is removable from the frame 24. In such an embodiment, the user must mount the axle 72 in the frame prior to putting the rear wheel 36 onto the axle 72.

Subsequent to mounting the rear wheel 36 on the axle 72, the user inserts the reduced diameter portion 112 of the hub 100 into the central axial bore of the rear wheel 36 until the flange portion 116 abuts the rear wheel 36, passing the axle 72 through the axial hole 120 of the hub 100. Next, the user places the washer over the axle 72 to about the flange portion 116 of the hub 100, and then inserts the Cotter pin 108 through the Cotter pin hole 124 of the axle, thereby securing the rear wheel 36 to the axle 72. The procedure is repeated on the other side of the cart 20 to secure the other rear wheel 36 to the axle 72. Disconnect the rear wheels 36 from the frame 24, the procedure is reversed.

Figure 17:
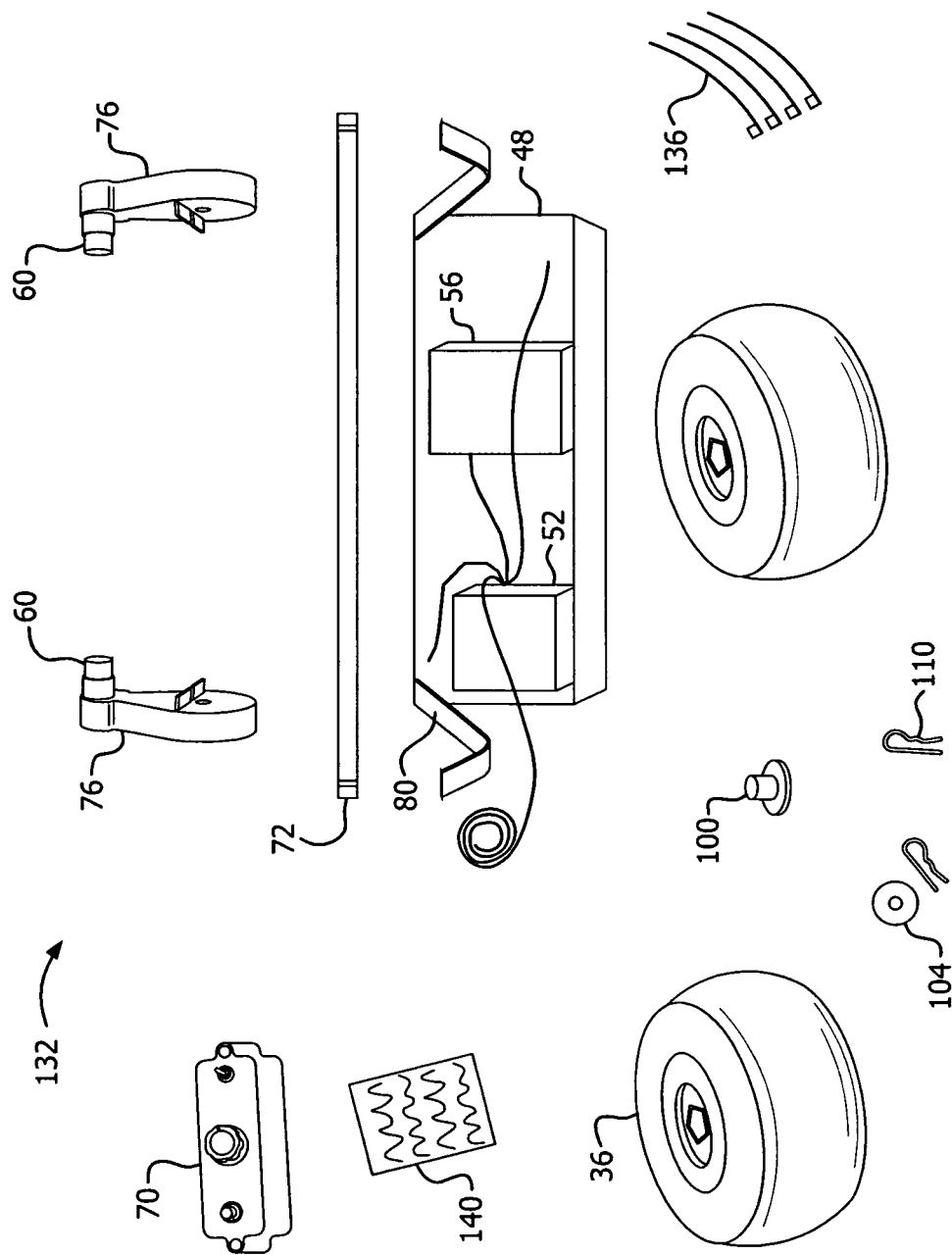
FIG. 17 is a perspective view of a kit for motorizing a cart in accordance with an embodiment of the present invention.

FIG. 17 is a perspective view of a kit 132 for motorizing a cart. According to one embodiment, the kit includes a battery 52, a drive controller 56, motors 60, gear housings 76, user controls 70, a pair of rear wheels 36, and an axle 72 to serve as the axis or rotation of the rear wheels 36. Additionally, the kit 132 includes connecting means for connecting the rear wheels to the frame of the cart. According to one embodiment, the connecting means includes a pair of hubs 100, a pair of washers 108, and a pair of cotter pins 110.

The kit 132 also includes a drive compartment 48 for housing the battery 52, drive controller 56, and the motors 60. The drive compartment 48 has a shape to provide clearance for the front wheels during transition between a collapsed cart mode and an expanded, upright cart mode. The drive compartment 48 is connectable to the frame 24 such that: the center of gravity of the cart 20 is positioned forward of the rear wheel rotation axis when the cart is in the expanded, upright mode; the drive compartment 48 does not impede collapsing of the storage compartment 32 and the frame 24; and the center of gravity of the cart 20 is substantially vertically aligned with the rear wheel rotation axis in the tilted mode, in which the cart 20 operates on the two rear wheels 36. The kit 132 further includes cabling 134 for electrically connecting the battery 52, the drive controller, 56, the motors 60, and the user controls 70. Further still, the kit 132 preferably includes attaching means 136 for attaching the cabling to the frame of the cart, for example, cable ties 136.

According to one embodiment, the kit 132 additionally includes instructions 140 for assembling the kit 132. The instructions 140 include instructions for mounting the user controls 70 on the handle of the cart and instructions for connecting the pair of rear wheels 36 to the frame, including instructions for connecting the pair of rear wheels 36 with the motors 60 using the gear housings 76. The instructions 140 also include instructions for mounting the drive compartment 48 to the frame of the cart, including: instructions for positioning the drive compartment 48 on the frame to position a center of gravity of the cart forward of the rear wheel rotation axis when the cart is in the expanded, upright mode; instructions to position the drive compartment 48 to not impede collapsing of the storage compartment and the frame; instructions to position the drive compartment 48 for clearance of the front wheels during transition between the collapsed mode and the expanded, upright mode; and instructions to position the drive compartment 48 to substantially vertically align the center of gravity of the cart with the rear wheel rotation axis in a tilted mode, in which the cart operates on the two rear wheels 36.

According to one embodiment of the kit 134, the battery 52, drive controller 56, and the motors 60 are pre-assembled in the drive compartment 48, and the motors 60 are electrically connected to the battery 52 and the drive controller 56.

Figure 18:
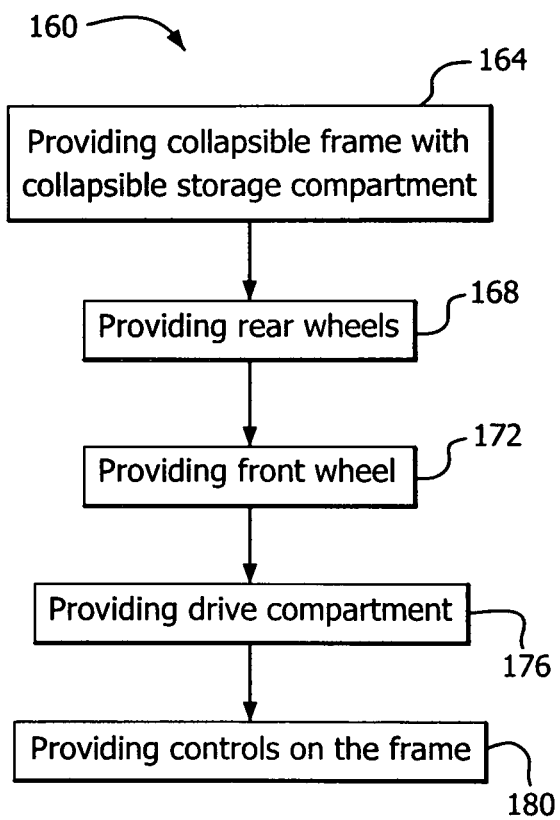
FIG. 18 is a flowchart illustrating a method of manufacturing a motorized cart.

FIG. 18 is a flowchart illustrating a method 160 of manufacturing a motorized cart. According to one embodiment, the method 160 includes an operation 164 of providing a collapsible frame and a collapsible storage compartment thereon, the frame and storage compartment being movable between a collapsed, storage mode and an expanded, upright mode. Another operation 168 of the method 160 is providing a pair of rear wheels on the frame, the cart being rotatable about an axis of rotation of the rear wheels. Additionally, the method 160 includes an operation 172 of providing at least one front wheel on the frame. The method also includes an operation 176 of providing a drive compartment housing a battery, a drive controller, and at least one motor electrically connected to the battery and the drive controller for driving at least one of the rear wheels. The drive compartment is positioned on the frame and shaped to: substantially vertically align a center of gravity of the cart with the rear wheel rotation axis when the cart is in a tilted mode; position the center of gravity of the cart forward of the rear wheel rotation axis in the expanded, upright mode; and provide for clearance of the at least one front wheel during transition between the collapsed, storage mode and the expanded, upright mode. The method further includes an operation 180 of providing controls on the frame for controlling speed and direction of travel.

Figure 19:
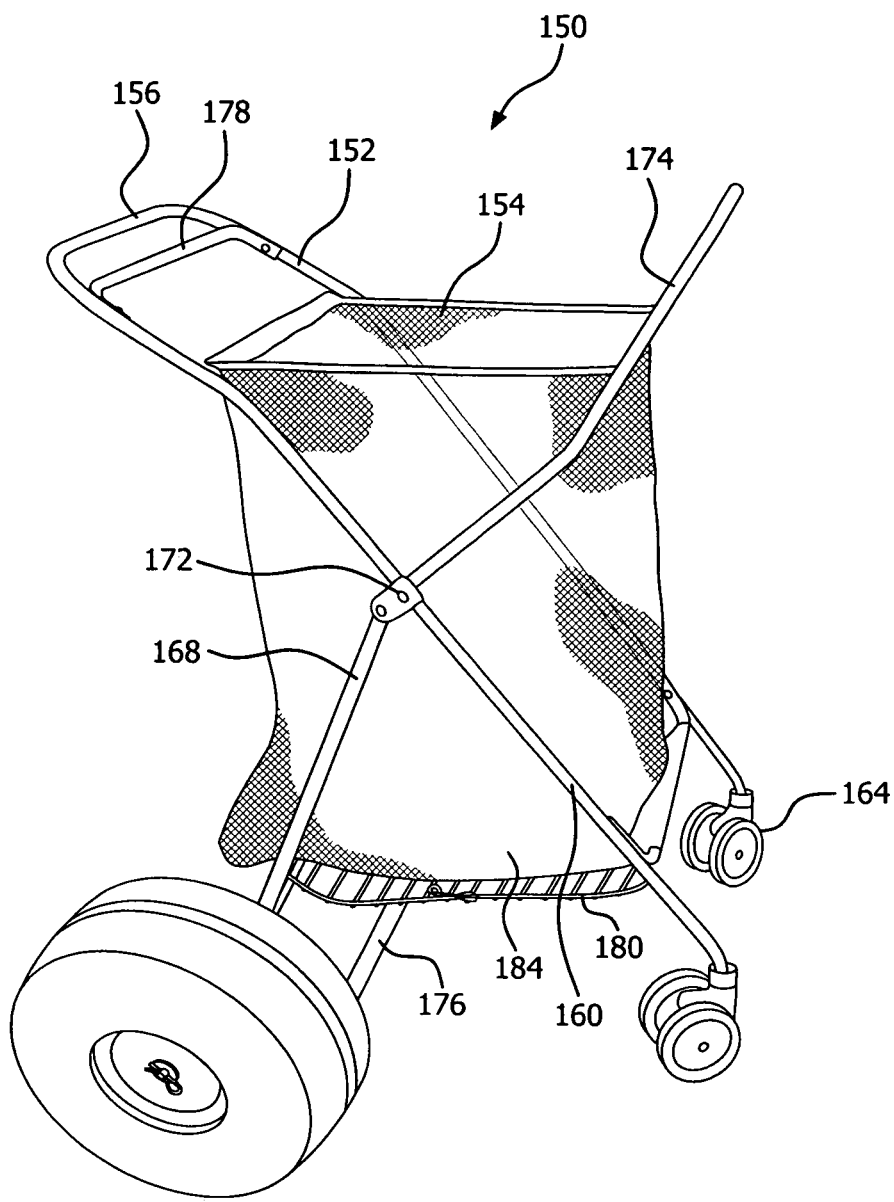
FIG. 19 is a perspective side view of a motorized cart in an expanded, upright mode in accordance with another embodiment of the present invention.

FIG. 19 is a perspective view of a motorized cart 150 in an expanded, upright mode in accordance with another embodiment of the present invention. The cart 150 includes a frame 152 and a collapsible storage compartment 154 attached to the frame 152. The frame 152 includes a handle 156 integrally formed as a unitary construction with a pair of front legs 160. According to one embodiment, each of the pair of front legs 160 has a pair of front wheels 164 connected by an axle to form a caster that swivels about a substantially vertical axis when the cart 150 is in the expanded, upright mode. According to another embodiment, the front wheels rotate, but do not swivel with respect to the front legs 160.

The frame 152 also includes a pair of rear legs 168 rotatably connected to the frame 152 via a connecting bracket 172, and a front supporting member 174 that is also rotatably connected to the frame 152 via the connecting bracket. The front supporting member 174 supports a front portion of the storage compartment 154 and rotates rearward to collapse the storage compartment 154. Moreover, while the user controls (substantially similar to the previously-described user controls 70) are omitted for clarity, the frame 152 has a control support member 178 connected to the handle 156 for supporting the user controls in conjunction with the handle 156.

The cart 150 additionally includes a drive compartment 176, which is substantially similar to the previously-described drive compartment 48. Accordingly, further description of the drive compartment 176 is omitted for brevity.

Figure 20:
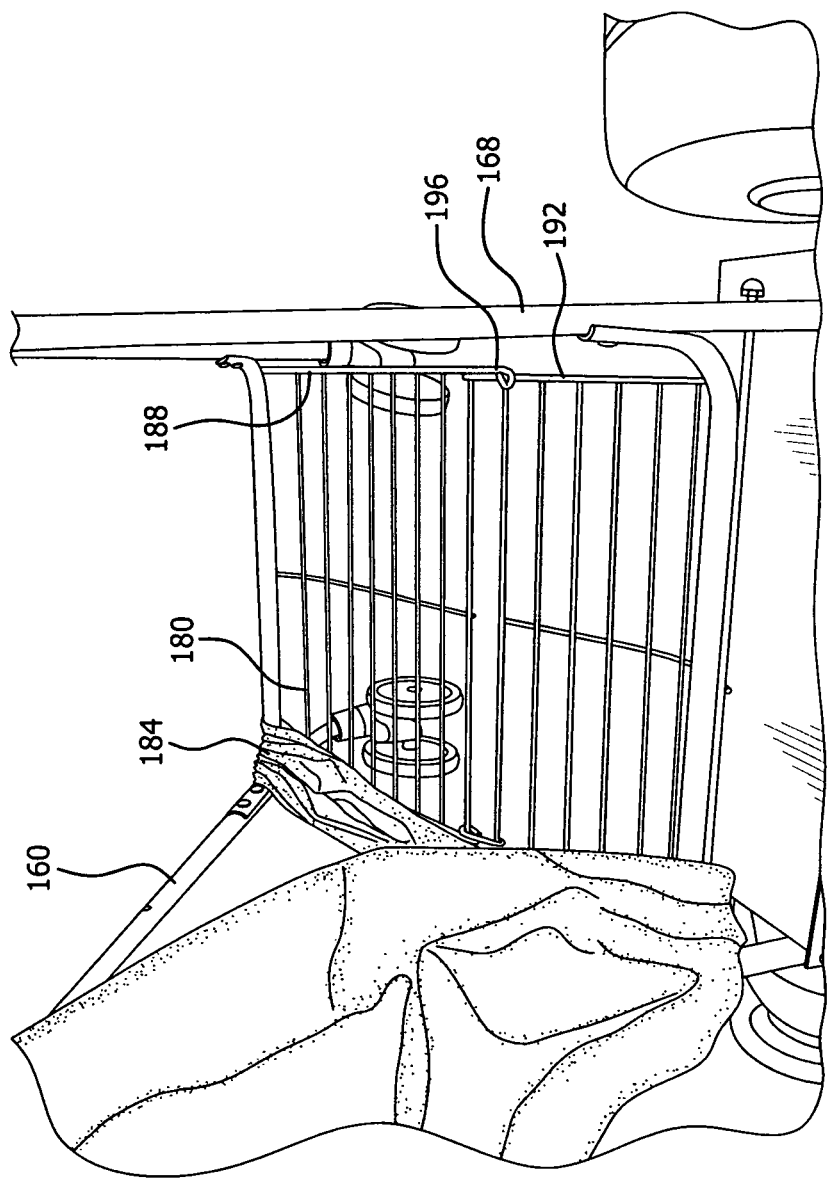
FIG. 20 is a partial perspective view of a folding support platform of the cart of FIG. 19.
Figure 21:
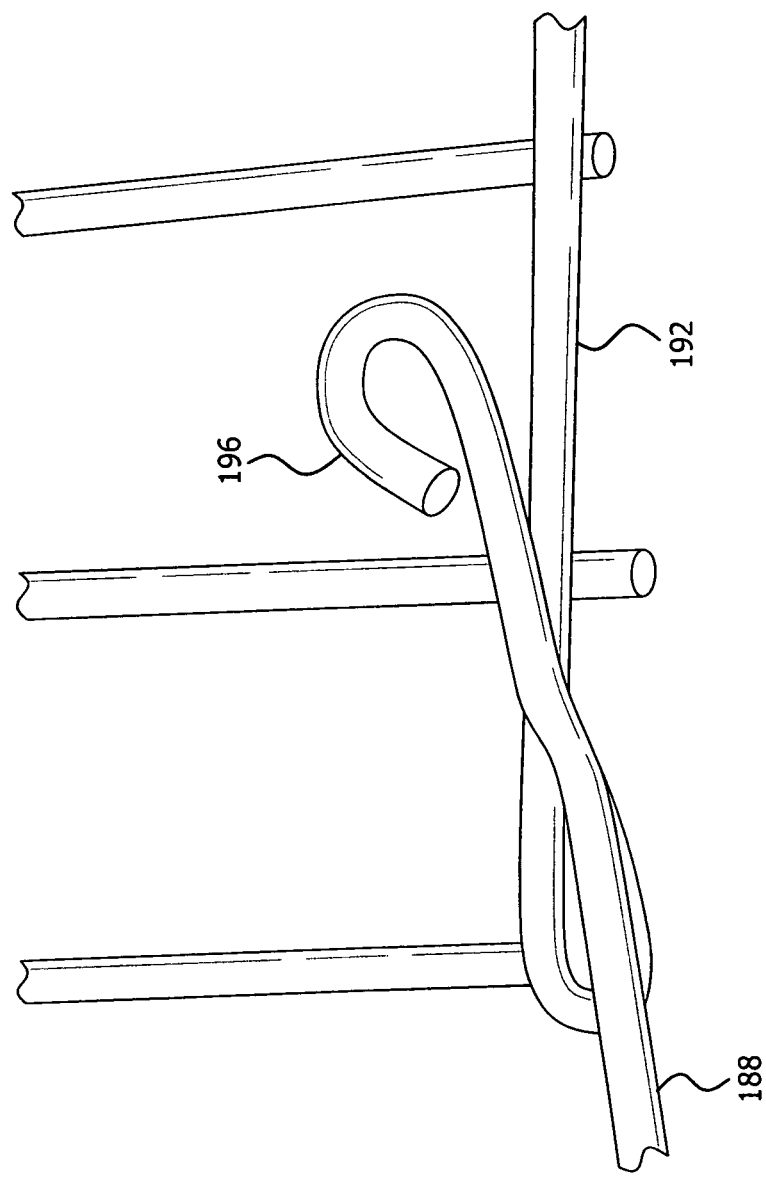
FIG. 21 is a partial perspective view of a locking mechanism of the cart of FIG. 19

Further, the cart 150 includes a folding support platform 180 and a secondary support 184. The secondary support 184 is constructed of a pliable material for preventing objects from falling through openings in the folding support platform 180, and connects to cross bars on both the front and rear of the frame 152. According to one embodiment, as shown in FIGS. 19, 20, 22, and 23, the folding support platform 180 is a welded, wire mesh. In FIGS. 20 and 21, the secondary support 184 is moved to the side for clarity. The folding support platform 180 includes a first portion 188 rotatably connected at the front of the frame 152, and a second portion 192 rotatably connected at the rear of the frame 152.

At substantially the center of the folding support platform 180, the first portion 188 hingedly connects with the second portion 192 for folding the folding support platform 180 when collapsing the cart 150. According to one embodiment, the first portion 188 includes a locking member 196 for selectively locking the cart 150 in the expanded, upright mode. One skilled in the art will appreciate that the second portion 192 or both the first and second portions 188 and 192 may include a locking member 196 without departing from the scope of the present invention. As the cart 150 fully expands in the expanded, upright mode, the locking member 196 engages the second portion 192 to prevent further rotation of the folding support platform 180.

According to one embodiment, when the user fully expands the cart 150 into the expanded, upright mode, the user presses down on a center of the folding support platform 180 to "spring" open the folding support platform 182 in a substantially planar and horizontal configuration. This springing action rotates the first and second portions 188 and 192 until the locking member 196 engages the second portion 192 to lock the cart 150 in the expanded, upright mode, as shown in FIG. 21. The weight of items placed on the secondary support 184 (or directly on the folding support platform 180) helps to hold the folding support platform 180 in the planar, horizontal position and keep the cart 150 locked in the expanded, upright mode.

Figure 22:
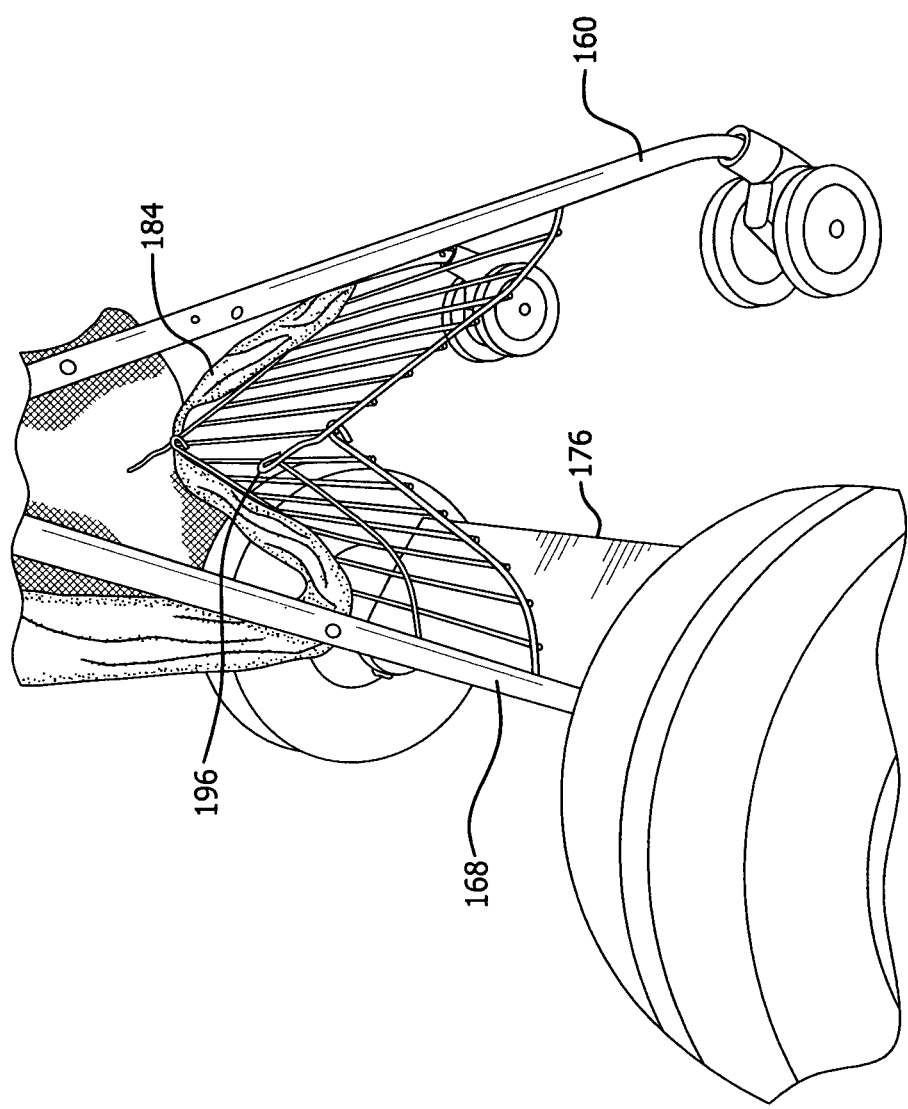
FIG. 22 is a partial perspective side view of the cart of FIG. 19 during collapsing.
Figure 23:
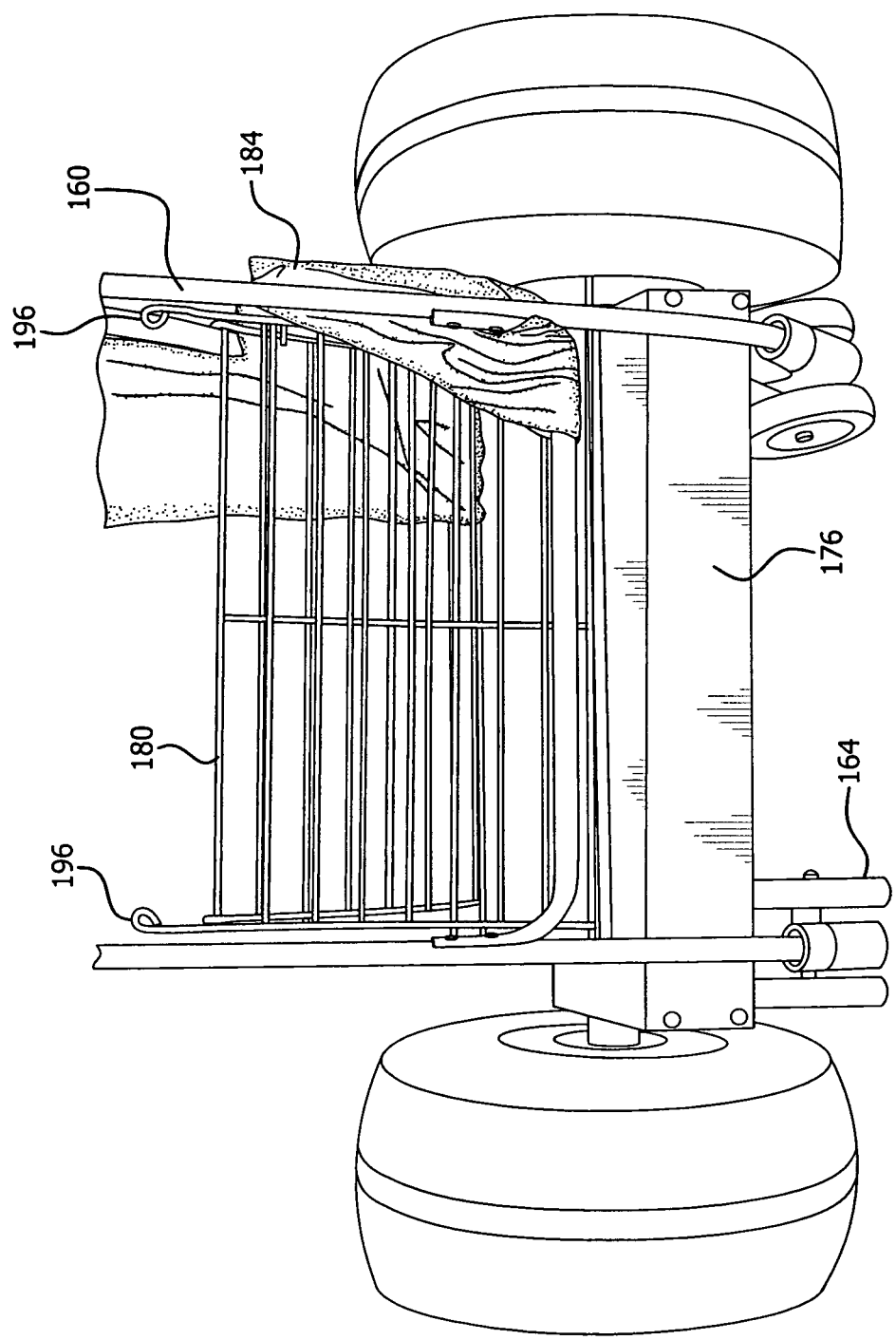
FIG. 23 is a partial perspective view of the cart of FIG. 19 in a collapsed mode.

To fold up or collapse the cart 150, the user lifts the locking member 196 or the center of the folding support platform 180. This action, as shown in FIGS. 22 and 23, brings the front and rear legs 160 and 168 together and raises the center of the folding support platform. As shown in FIG. 23, with the cart 150 in the collapsed mode, the front wheels 164 are positioned adjacent to and beneath the drive compartment 176 to minimize storage volume of the cart 150.

Figure 24:
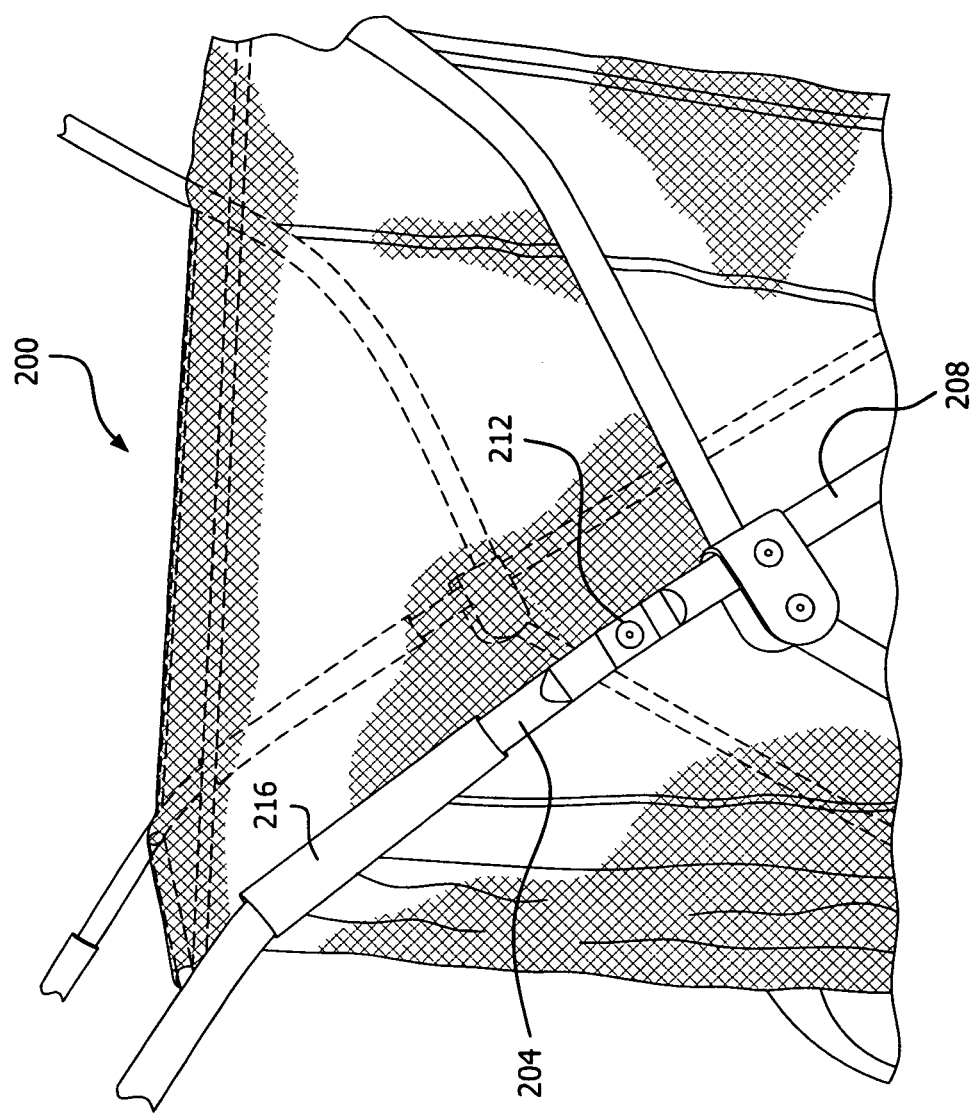
FIGS. 24 and 25 are partial perspective views of a motorized cart in accordance with another embodiment of the present invention.
Figure 25:
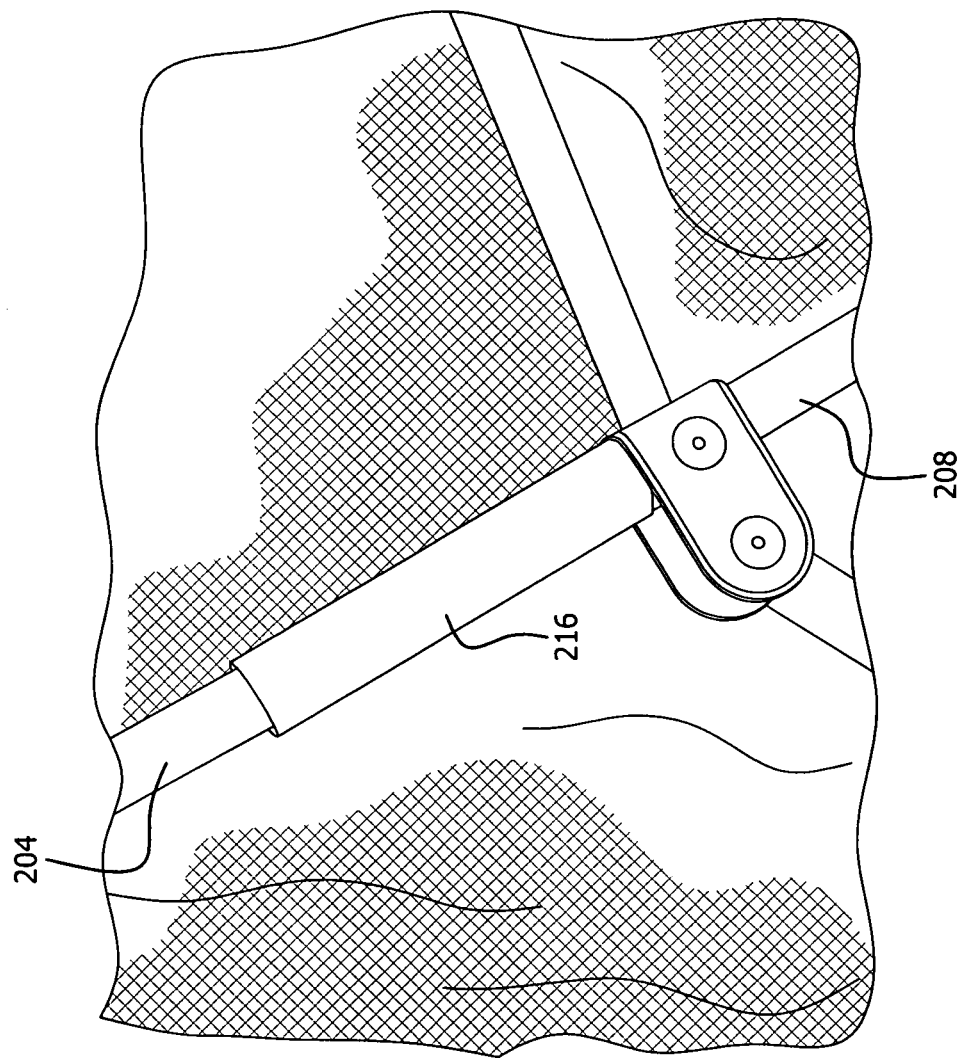

FIGS. 24 and 25 are partial perspective views of a motorized cart 200 in accordance with another embodiment of the present invention. The cart 200 is substantially similar to the cart 150, but rather than the handle and the front legs being formed as a unitary construction, the handle 204 rotatably connects to the front legs 208 at a pair of rotation joints 212.

As shown in FIGS. 24 and 25, the frame also includes a locking sleeve 216, that selectively slides over the rotation joint 212 to lock the handle 204 in an aligned position in which a portion of the handle 204 is aligned with the front legs 208. To rotate the handle 204 relative to the front leg 208, the user slides the locking sleeves 216 upward to expose the rotation joints 212, and subsequently rotates the handle 204 to the desired position.

Figure 26:
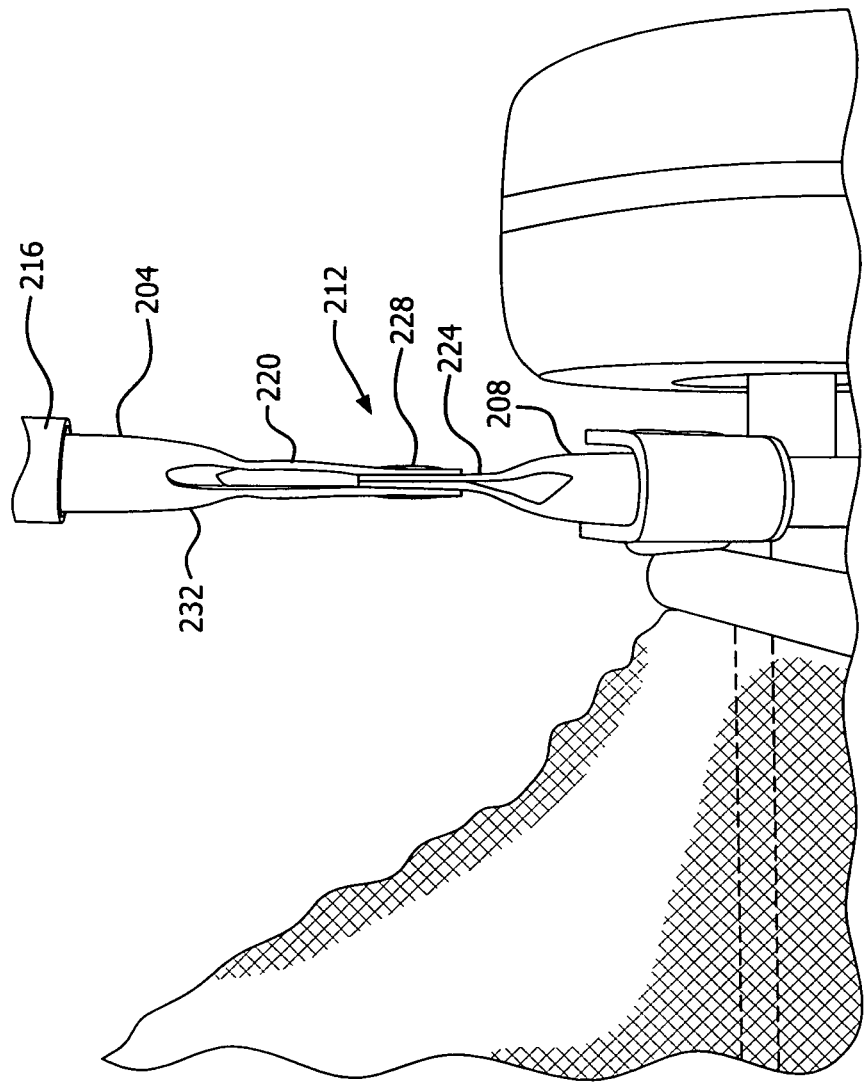
FIG. 26 is a partial perspective view of a rotation joint of the cart of FIG. 24.

As shown in FIG. 26, each rotation joint 212 includes a U-shaped portion 220 disposed at an end of the handle 204 and a tapered portion 224 disposed at an end of the front leg 208 that fits into the U-shaped portion 220. A fastener 228, such as a nut and bolt, rotatably connects the U-shaped portion 220 and the tapered portion 224. One skilled in the art will appreciate that the U-shaped portion 220 may be disposed at the end of the front leg 208 and the tapered portion 224 may be disposed at the end of the handle 204 without departing from the scope of the present invention. According to one embodiment, the U-shaped portion 220 includes a stop 232 to prevent rotation of the handle past a forward position (FIG. 27) in which the handle 204 is positioned in front of the front legs 208.

Figure 28:
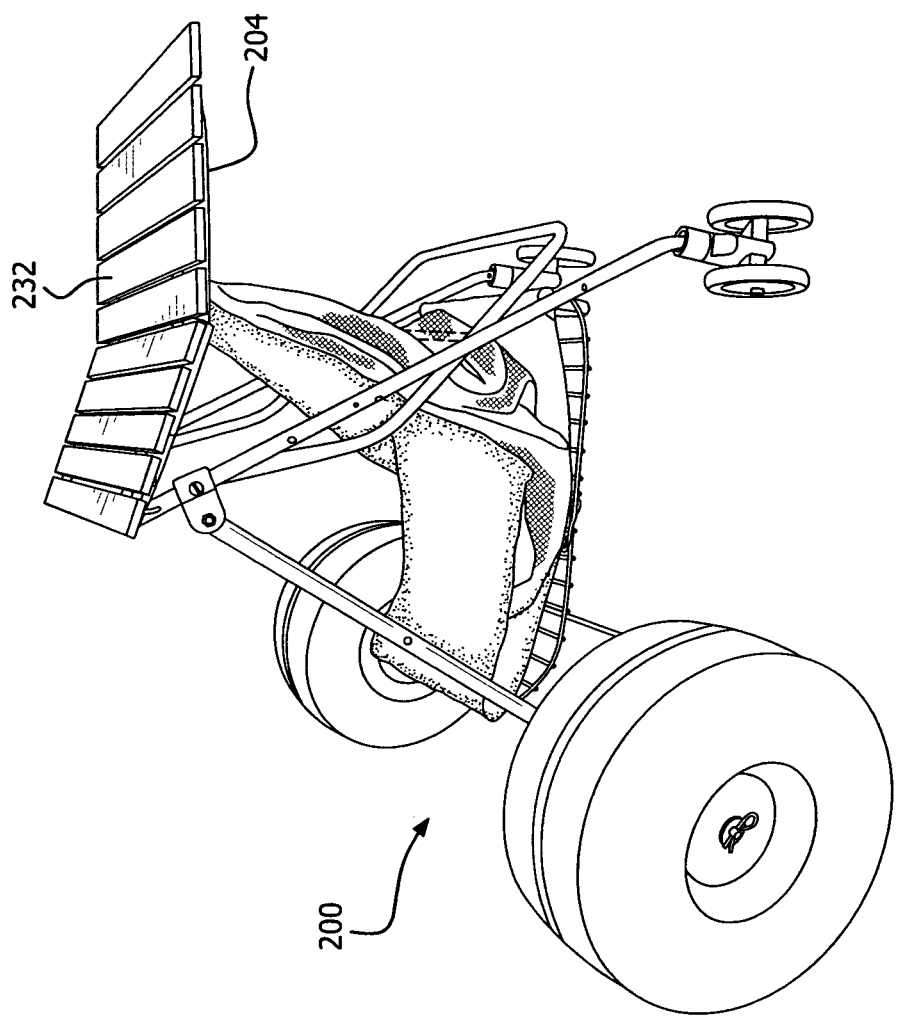
FIG. 28 is a perspective view illustrating an embodiment of an upper support of the cart of FIG. 24.

According to one embodiment, as shown in FIG. 28, the cart 200 includes an upper support 232 disposed on the handle 204. When the handle 204 is in the forward position, the upper support 232 is substantially horizontal, thereby providing a tray or table to support, for example, a radio or a beverage. According to one embodiment, the upper support 232 is selectively removable from the handle 204. One skilled in the art will appreciate that clips may be used to selectively secure the upper support 232 to the handle 204, and that fasteners, such as screws or rivets, may be used to more permanently secure the upper support 232 to the handle 204. In the embodiment shown in FIG. 28, the upper support 232 includes a number of individual slats that are flexibly bound together, for example, by a strip or number of strips of cloth or nylon, like a tambour of a rolltop desk. According to another embodiment, the individual slats are not joined together, but are individually fastened to the handle 204, to provide a custom-sized upper support 232. According to yet another embodiment, the upper support 232 includes a plate-like single surface, for example, a Lexan sheet.

Figure 29:
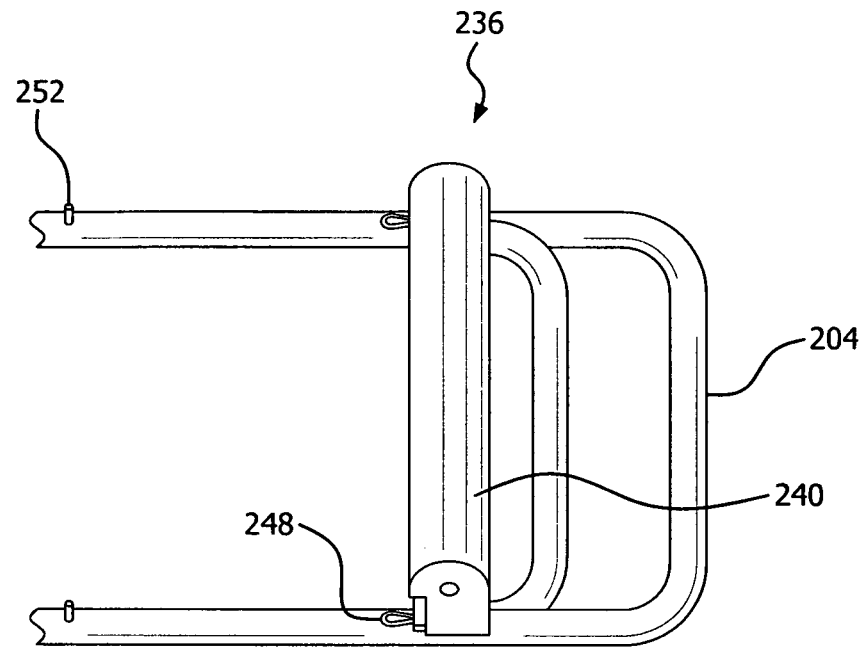
FIGS. 29 and 30 are partial perspective views illustrating another embodiment of an upper support of the cart of FIG. 24.
Figure 30:
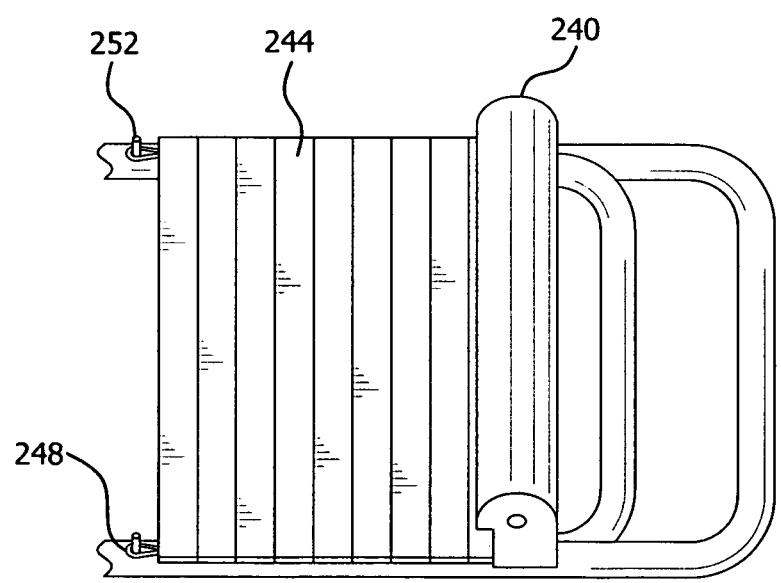

According to another embodiment, as shown in FIGS. 29 and 30, an upper support 236 includes a housing 240 connected to the handle 204, and a support portion 244 connected to and extendable from the housing 240. The support portion 244 includes support connectors 248 disposed at an end thereof that are connectable to handle connectors 252 disposed on the handle 204 to maintain the support portion 244 in an extended position, as shown in FIG. 30. The support connectors 248 and the handle connectors 252 may be, for example, rings and posts, hooks, interlocking tabs, or hook and loop fasteners, such as Velcro. One skilled in the art will appreciate that other types of connectors may be used without departing from the scope of the present invention. According to one embodiment, the support portion 244 includes a tambour that is spring-biased toward a retracted position in the housing 240.

Figure 27:
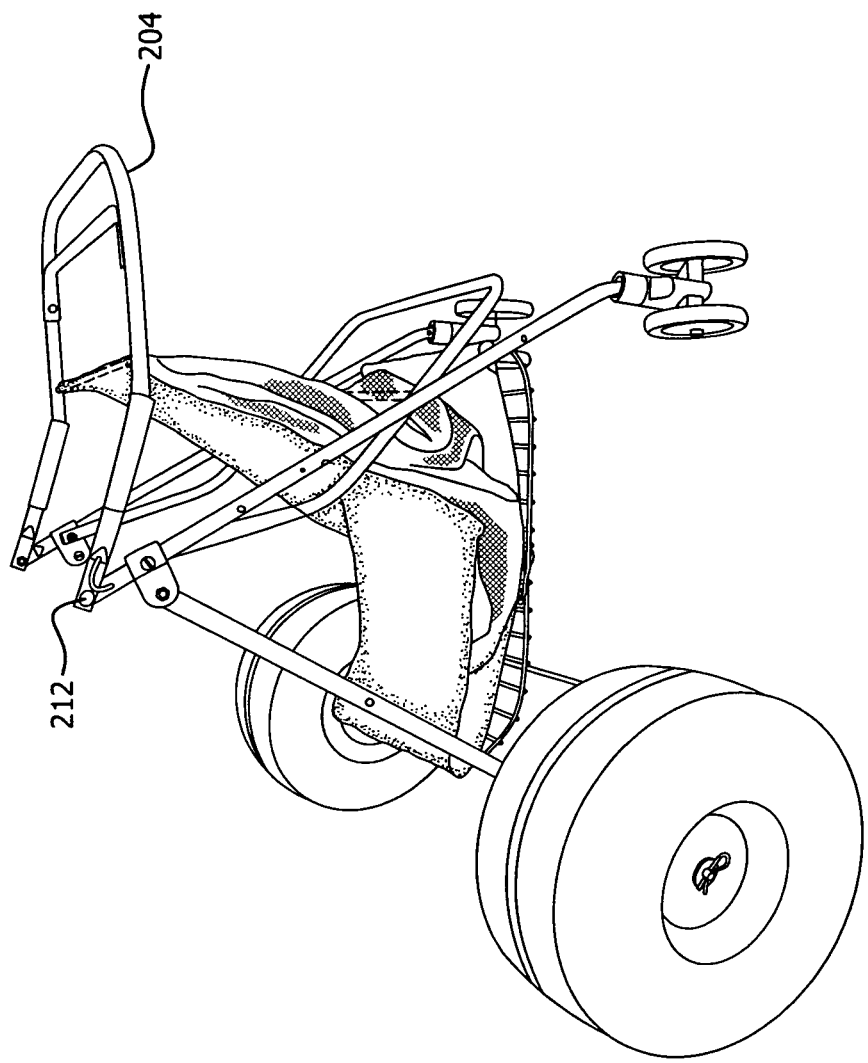
FIG. 27 is a perspective view of the cart of FIG. 24 illustrating a handle in a forward position.
Figure 31:
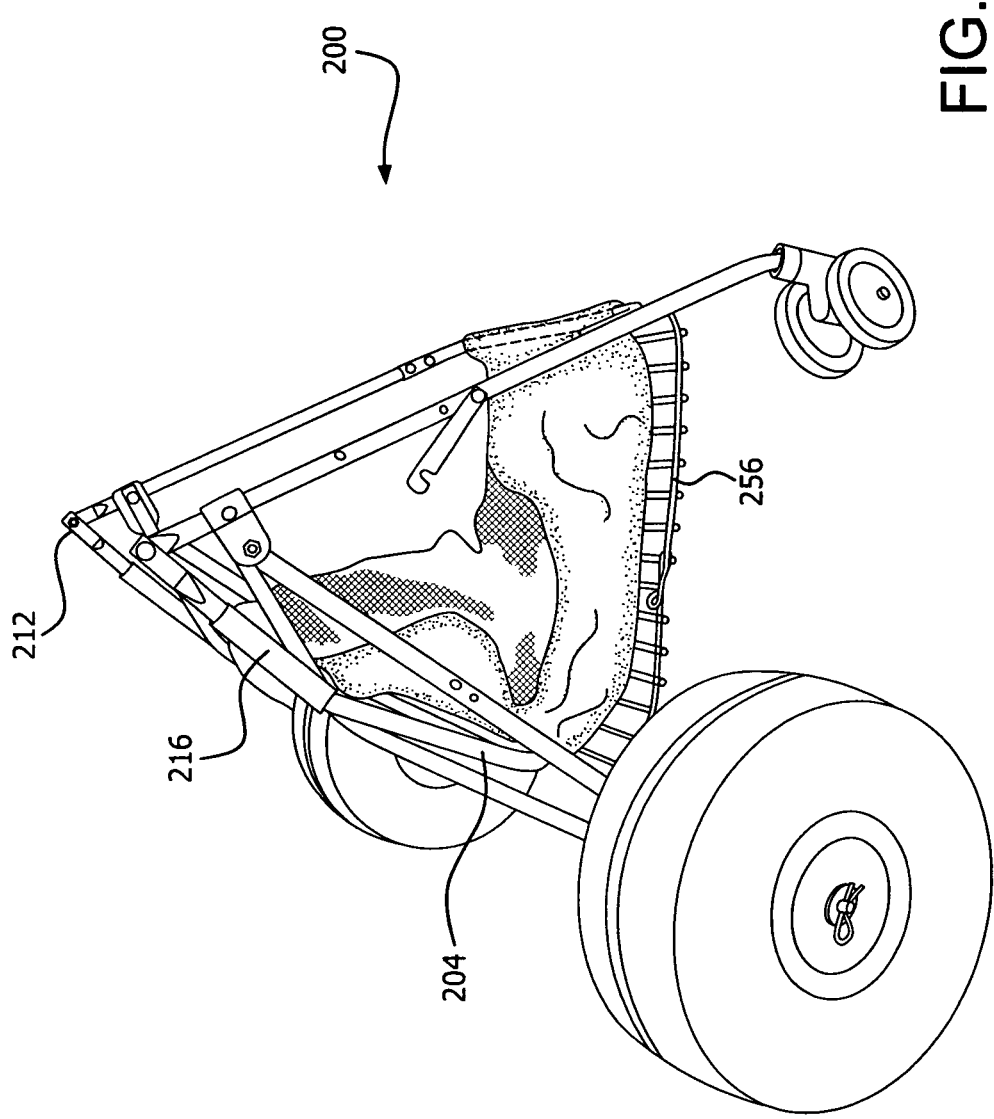
FIG. 31 is a perspective side view of the cart of FIG. 24.
Figure 32:
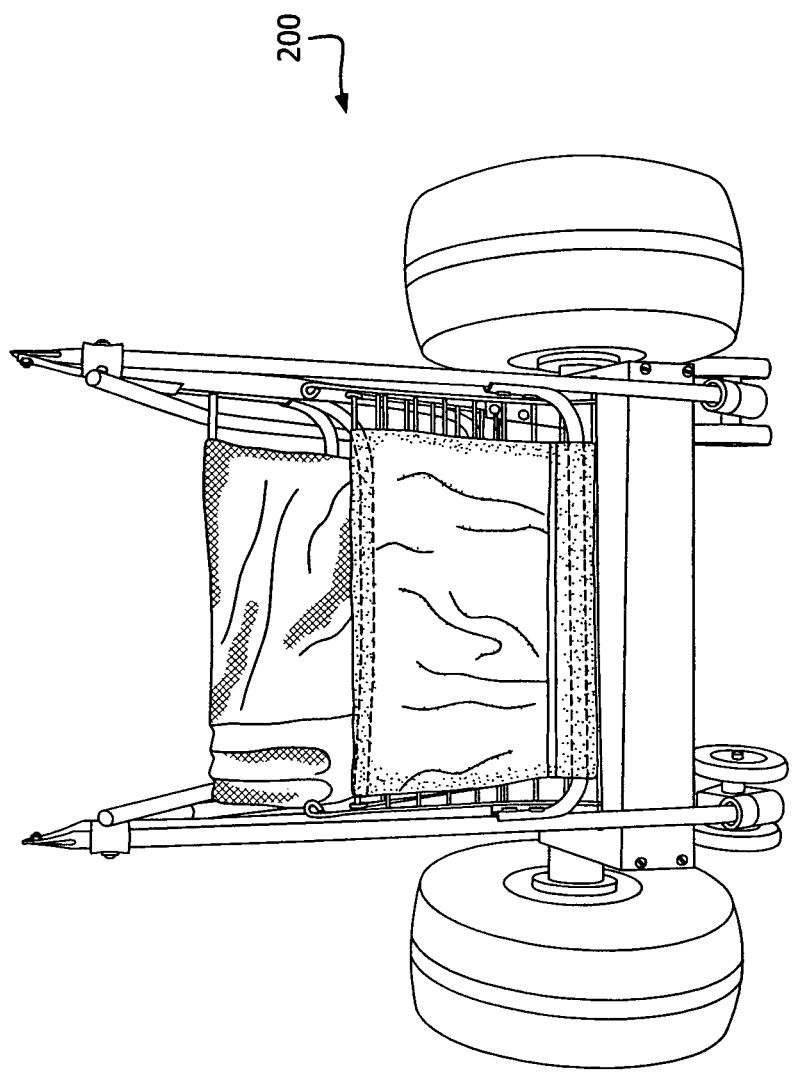
FIG. 32 is a perspective view of the cart of FIG. 24 in a collapsed mode.

In addition to being rotatable to the forward position illustrated in FIG. 27, the handle 204 is also rotatable to a rear position behind the front legs 208, as illustrated in FIG. 31. In this configuration, if the user lifts the locking member 256, the cart 200 collapses to the collapsed mode illustrated in FIG. 32.

Figure 33:
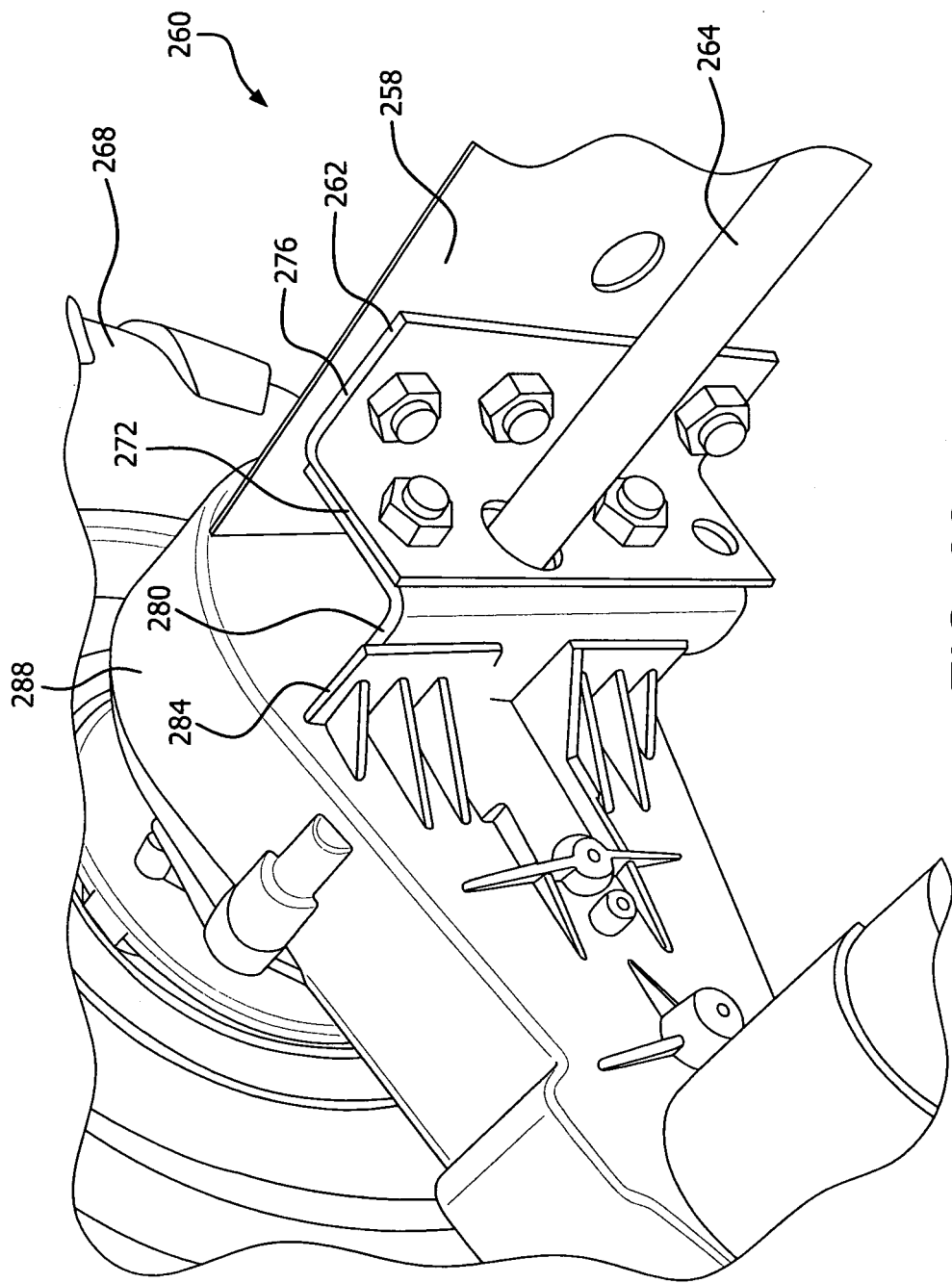
FIGS. 33 and 34 are partial perspective views of an interior of a drive compartment of a motorized cart in accordance with another embodiment of the present invention.
Figure 34:
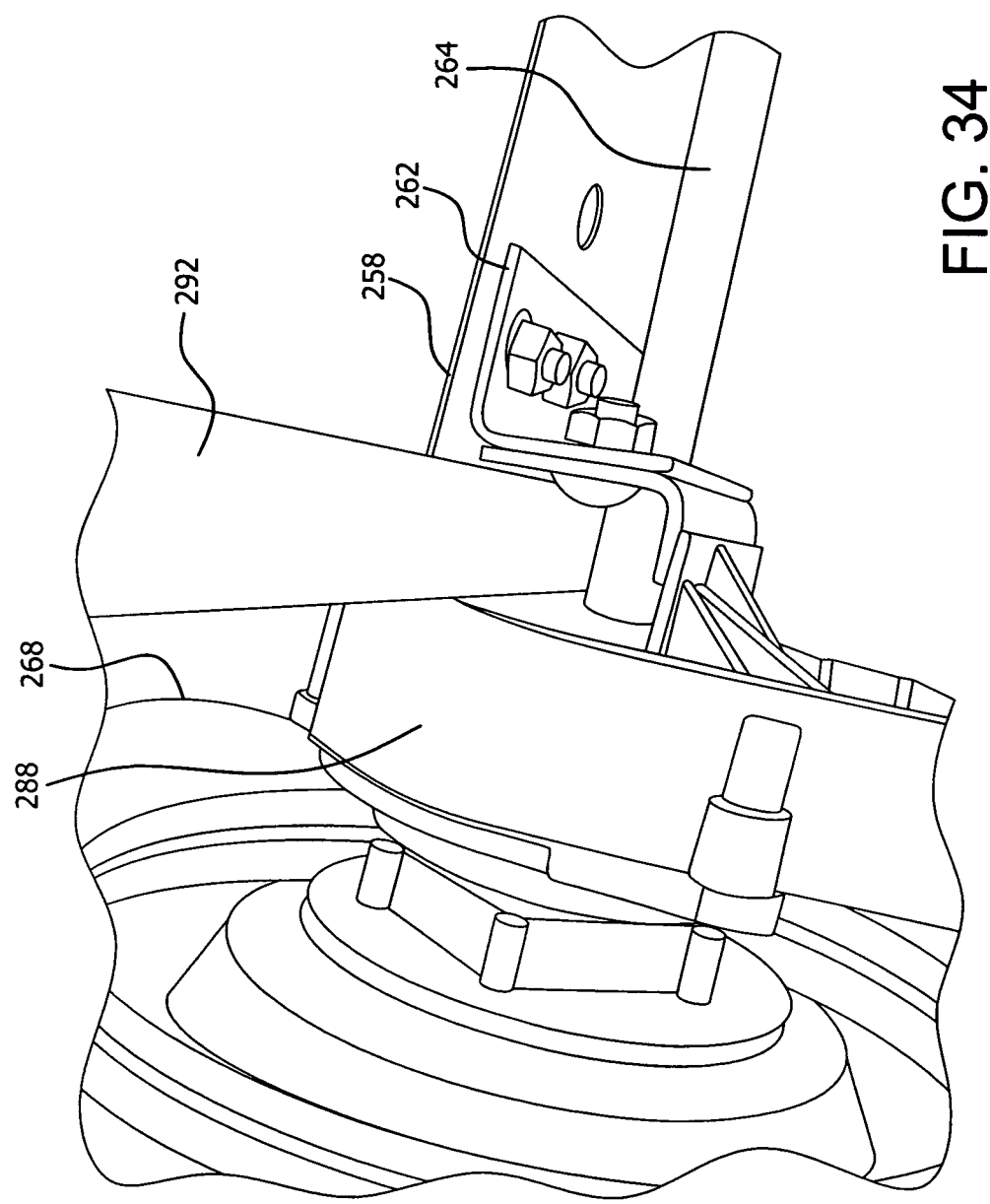

FIGS. 33 and 34 are partial perspective views of an interior of a drive compartment 258 of a motorized cart 260 in accordance with another embodiment of the present invention. The cart 260 is substantially similar to the cart 200, except that a pair of driving compartment supports 262 disposed in the driving compartment 258 support the axle 264 connecting the two rear wheels 268. According to one embodiment, the supports 262 are Z-shaped brackets having a middle portion 272 and a pair of end portions 276 and 280 disposed on opposing ends of the middle portion 272. Fasteners, for example nuts and bolts, secure the end portions 276 to a rear wall of the driving compartment 258. The end portions 280 support engaging protrusions 284 of the motor's gear housing 288, and the middle portions 272 have an opening therethrough for supporting the axle 264.

As shown in FIGS. 33 and 34, the driving compartment supports 262 and the rear wall of the driving compartment 258 form a pair of pockets for receiving ends of the rear legs 292. The top wall or cover of the driving compartment 258, which is removed for clarity, is notched to accommodate the rear legs 292. According to one embodiment, the gear housings 288 also form a portion of the pockets, and the driving compartment's bottom wall or floor, acts as a stop for insertion of the rear legs 292. Thus, the supports 262 support the axle 264 in front of the rear legs 292. This positions the rear wheel rotation axis closer to a center of the cart 260, thereby improving balance in the tilted mode and improving stability in the expanded, upright mode. Fasteners, such as screws, secure the rear legs to the driving compartment's rear wall and help stiffen the driving compartment 258.

The driving compartment supports 262 also stiffen the driving compartment 258. In addition to the end portions 276 being secured to the driving compartment's rear wall, and thus acting as stiffening plates, the respective bottoms of the supports 262 contact a bottom wall of the driving compartment 258, thereby stiffening the bottom wall.

According to one embodiment, the driving compartment supports 262 each include a pair of L-shaped brackets adjustably connected to each other by fasteners, such as nuts and bolts. According to another embodiment, the supports 262 each include a Z-shaped bracket formed as a unitary construction. In addition, according to one embodiment, the supports 262 are made of, for example, sixteen-gauge steel. One skilled in the art will appreciate that other materials may be used without departing from the scope of the present invention. Further, according to one embodiment, the driving compartment 258, including the battery, the drive controller, the motors, and the driving compartment supports 262, is provided as a self-contained unit for attachment to a frame.

Thus, embodiments of the present invention provide a motorized beach cart that has a collapsible storage container and a collapsible frame for easy storage and transportation of the cart. Additionally, embodiments of the present invention provide a cart that is stable, ruggedized, and adaptable to multiple transportation situations, including traversing sand and stairs.

Although only a few embodiments of the present invention have been shown and described, the present invention is not limited to the described embodiments. Instead, it will be appreciated by those skilled in the art that changes may be made to these embodiments without departing from the principles and spirit of the invention, the scope of which is defined by the claims and their equivalents.

What is claimed is:

1. A motorized cart, comprising:
    a collapsible frame having front legs, rear legs rotatably connected to the front legs at a point, and a handle;
    a collapsible storage compartment connected to the frame;

at least three wheels connected to the frame, the at least three wheels comprising two rear wheels and at least one front wheel;
means for connecting the rear wheels at a rear of the frame for rotating about a single axis;
a folding support platform comprising first and second portions hingedly connected to each other, the first portion being rotatably connected at a front of the frame, and the second portion being rotatably connected to the rear of the frame; and
a drive compartment housing a battery, a drive controller, and at least one motor electrically connected to the battery and the drive controller for driving at least one of the rear wheels, wherein the drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability in the expanded, upright mode;
wherein the drive compartment is shaped and positioned on the frame to:
  permit the collapsing of the storage compartment and the frame to a collapsed mode for compact storage of the cart, and
  to provide clearance for the at least one front wheel during transition between the collapsed mode and the expanded, upright mode; and
wherein the drive compartment is positioned on the frame to substantially vertically align the center of gravity of the cart with the rear wheel rotation axis in a tilted mode, in which the cart operates on the two rear wheels.

2. The cart according to claim 1, wherein the drive compartment is positioned, the rear wheels are sized, and the output of the at least one motor is designed to provide a two-wheeled stair climbing mode in which the cart climbs stairs on the two rear wheels.

3. The cart according to claim 2, wherein the drive compartment and the storage compartment are disposed on the frame so that in the stair-climbing mode, the center of gravity of the cart is positioned forward of the rear wheel rotation axis.

4. The cart according to claim 1, wherein at least one of the first and second portions of the folding support platform comprises a locking member for selectively locking the cart in the expanded, upright mode.

5. The cart according to claim 1, further comprising a secondary support constructed of a pliable material and connected to the front and rear of the frame, for preventing objects from falling through openings in the folding support platform.

6. The cart according to claim 1, wherein the frame comprises:
  a pair of front legs integrally formed as a unitary construction with the handle; and
  a pair of rear legs rotatably connected to the front legs and handle.

7. A motorized cart, comprising:
a collapsible frame having a handle;
a collapsible storage compartment connected to the frame;
at least three wheels connected to the frame, the at least three wheels comprising two rear wheels and at least one front wheel;
means for connecting the rear wheels at a rear of the frame for rotating about a single axis;
a folding support platform comprising first and second portions hingedly connected to each other, the first portion being rotatably connected at a front of the frame, and the second portion being rotatably connected to the rear of the frame; and
a drive compartment housing a battery, a drive controller, and at least one motor electrically connected to the battery and the drive controller for driving at least one of the rear wheels, wherein the drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability in the expanded, upright mode;
wherein the drive compartment is shaped and positioned on the frame to:
  permit the collapsing of the storage compartment and the frame to a collapsed mode for compact storage of the cart, and
  to provide clearance for the at least one front wheel during transition between the collapsed mode and the expanded, upright mode;
wherein the drive compartment is positioned on the frame to substantially vertically align the center of gravity of the cart with the rear wheel rotation axis in a tilted mode, in which the cart operates on the two rear wheels; and
wherein in the collapsed mode, the at least one front wheel are positioned adjacent to and beneath the drive compartment.

8. A motorized cart, comprising:
a collapsible frame having a handle;
a collapsible storage compartment connected to the frame;
at least three wheels connected to the frame, the at least three wheels comprising two rear wheels and at least one front wheel;
means for connecting the rear wheels at a rear of the frame for rotating about a single axis;
a folding support platform comprising first and second portions hingedly connected to each other, the first portion being rotatably connected at a front of the frame, and the second portion being rotatably connected to the rear of the frame; and
a drive compartment housing a battery, a drive controller, and at least one motor electrically connected to the battery and the drive controller for driving at least one of the rear wheels,
wherein the drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability in the expanded, upright mode;
wherein the drive compartment is shaped and positioned on the frame to:
  permit the collapsing of the storage compartment and the frame to a collapsed mode for compact storage of the cart, and
  to provide clearance for the at least one front wheel during transition between the collapsed mode and the expanded, upright mode;
wherein the drive compartment is positioned on the frame to substantially vertically align the center of gravity of the cart with the rear wheel rotation axis in a tilted mode, in which the cart operates on the two rear wheels; and
wherein the frame comprises a pair of front legs to which the handle is rotatably connected at a rotation joint.

9. The cart according to claim 8, further comprising a locking sleeve selectively slidable over the rotation joint to lock the handle in an aligned position in which a portion of the handle is aligned with the front legs.

10. The cart according to claim 8, wherein the handle is selectively rotatable to a rear position behind the front legs, an aligned position in which a portion of the handle is aligned with the front legs, and a forward position in front of the front legs.

11. The cart according to claim 10, wherein the front legs comprise a stop to maintain the handle in the forward position.

12. The cart according to claim 10, further comprising an upper support connected to the handle.

13. The cart according to claim 12, wherein the upper support is selectively removable from the handle.

14. The cart according to claim 12, wherein the upper support comprises:
a housing connected to the handle at a first portion thereof; and
a support portion connected to and extendable from the housing, the support portion being connectable to the handle at a second portion thereof.

15. A motorized cart, comprising:
a collapsible frame having a handle;
a collapsible storage compartment connected to the frame;
at least three wheels connected to the frame, the at least three wheels comprising two rear wheels and at least one front wheel;
means for connecting the rear wheels at a rear of the frame for rotating about a single axis;
a folding support platform comprising first and second portions hingedly connected to each other, the first portion being rotatably connected at a front of the frame, and the second portion being rotatably connected to the rear of the frame;
a drive compartment housing a battery, a drive controller, and at least one motor electrically connected to the battery and the drive controller for driving at least one of the rear wheels, wherein the drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability in the expanded, upright mode; and
gearing disposed between the at least one motor and the at least one driven wheel, wherein a portion of the gearing is concentrically disposed on the rear wheel rotation axis to engage and drive the at least one driven wheel;
wherein the drive compartment is shaped and positioned on the frame to:
permit the collapsing of the storage compartment and the frame to a collapsed mode for compact storage of the cart, and
to provide clearance for the at least one front wheel during transition between the collapsed mode and the expanded, upright mode;
wherein the drive compartment is positioned on the frame to substantially vertically align the center of gravity of the cart with the rear wheel rotation axis in a tilted mode, in which the cart operates on the two rear wheels;

wherein the frame comprises a pair of front legs connected with the handle and a pair of rear legs rotatably connected with the front legs;
wherein the means for connecting the rear wheels comprises an axle connecting the two rear wheels and a pair of driving compartment supports disposed in the driving compartment;
wherein the driving compartment supports and a rear wall of the driving compartment form a pair of pockets for receiving ends of the rear legs; and
wherein the driving compartment supports support the axle in front of the rear legs.

16. The cart according to claim 15, wherein the driving compartment supports contact the rear wall and a bottom wall of the driving compartment to stiffen the driving compartment.

17. The cart according to claim 16, wherein each driving compartment support comprises a Z-shaped bracket having a middle portion and a pair of end portions disposed on opposing ends of the middle portion; and
wherein one of the end portions of each driving compartment support is secured to the rear wall of the driving compartment, each of the middle portions supports the axle, and at least one of the remaining end portions supports the at least one motor.

18. The cart according to claim 17, wherein each Z-shaped bracket comprises a pair of L-shaped brackets adjustably connected to each other.

19. A method of manufacturing a motorized cart, comprising:
providing a collapsible frame and a collapsible storage compartment thereon, the frame and storage compartment being movable between a collapsed, storage mode and an expanded, upright mode, the frame having front legs, rear legs rotatably connected to the front legs at a point, and a folding support platform comprising first and second portions hingedly connected to each other, the first portion being rotatably connected at a front of the frame, and the second portion being rotatably connected to a rear of the frame;
providing a pair of rear wheels on the frame, the cart being rotatable about an axis of rotation of the rear wheels;
providing at least one front wheel on the frame;
providing a drive compartment housing a battery, a drive controller, and at least one motor electrically connected to the battery and the drive controller for driving at least one of the rear wheels, the drive compartment having a pair of driving compartment supports for supporting an axle connecting the rear wheels in front of the rear legs, the drive compartment being positioned on the frame and shaped to:
substantially vertically align a center of gravity of the cart with the rear wheel rotation axis when the cart is in a tilted mode,
position the center of gravity of the cart forward of the rear wheel rotation axis in the expanded, upright mode; and
provide for clearance of the at least one front wheel during transition between the collapsed, storage mode and the expanded, upright mode; and
providing controls on the frame for controlling speed and direction of travel.

* * * * *